(12) United States Patent
Shiraishi

(10) Patent No.: US 8,218,217 B2
(45) Date of Patent: Jul. 10, 2012

(54) LIGHT SCANNING DEVICE AND THRUST-DIRECTION FORCE CANCELING METHOD

(75) Inventor: Takashi Shiraishi, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/217,785

(22) Filed: Aug. 25, 2011

(65) Prior Publication Data

US 2012/0050836 A1 Mar. 1, 2012

Related U.S. Application Data

(62) Division of application No. 12/023,674, filed on Jan. 31, 2008, now Pat. No. 8,027,076.

(60) Provisional application No. 60/887,502, filed on Jan. 31, 2007.

(30) Foreign Application Priority Data

Nov. 9, 2007 (JP) .................................. 2007-291544

(51) Int. Cl.
*G02B 26/08* (2006.01)

(52) U.S. Cl. .................................................... 359/216.1
(58) Field of Classification Search ..... 359/216.1–218.1
See application file for complete search history.

(56) References Cited

U.S. PATENT DOCUMENTS

| 4,795,224 | A | * | 1/1989 | Goto ........................... 359/212.2 |
| 6,292,285 | B1 | | 9/2001 | Wang et al. |
| 2007/0068231 | A1 | * | 3/2007 | Makino ........................ 73/65.07 |

FOREIGN PATENT DOCUMENTS

| JP | 2000-002846 | 1/2000 |
| JP | 2003-280314 | 10/2003 |

OTHER PUBLICATIONS

U.S. Office Action for U.S. Appl. No. 12/023,674 mailed on Nov. 15, 2010.

* cited by examiner

*Primary Examiner* — Euncha Cherry
(74) *Attorney, Agent, or Firm* — Turocy & Watson, LLP

(57) ABSTRACT

At least a part of a first thrust-direction force generated by air resistance received by at least one surface of reflection surfaces arrayed in a rotating direction of a polygon mirror and tilted with respect to a rotation axis of the polygon mirror is canceled by a second thrust-direction force generated by air resistance received by a surface tilted with respect to the rotation axis in a direction opposite to the surface where the first thrust-direction force is generated.

11 Claims, 34 Drawing Sheets

FIG.8

$$x = \frac{cuy \times y^2 + cuz \times z^2}{1+\sqrt{1-ay \times cuy^2 \times y^2 - az \times cuz^2 \times z^2}} + \sum a_{lm} \times y^l \times z^m$$

LENS SURFACE SHAPE DEFINING FORMULA

FIG. 9

DIAMETER OF INSCRIBED CIRCLE OF POLYGON MIRROR  X 40.0

POSITION OF ROTATION CENTER OF POLYGON MIRROR  Y 17.5  3.8
(POSITION AS VIEWED FROM LOCAL COORDINATE SYSTEM OF POLYGON REFLECTION SURFACE)
TILT ANGLE FROM CENTER OF ROTATION OF POLYGON MIRROR (rad)

| | $\theta_1$ | $\theta_2$ | $\theta_3$ | $\theta_4$ |
|---|---|---|---|---|
| | 0.0328 | -0.009 | -0.0321 | 0.0089 |

IMAGE FORMING POSITION OF FINITE LENS  814.3

| | SURFACE No. | CURVATURE |  | TH |  |  |  | REFRACTIVE INDEX N | NOTES |
|---|---|---|---|---|---|---|---|---|---|
| | | MAIN SCAN cuy | SUB SCAN cuz | COMMON | RAY1 | RAY2 | RAY3 | RAY4 | | |
| PRE-DEFLECTION OPTICAL SYSTEM | 1 | 0.0328 | 0 | 33.3 | | | | | 1.000 | |
| | 2 | 0 | 0.02078 | 5.0 | | | | | 1.511 | CYLINDRICAL LENS |
| | 3 | 0 | 0 | 82.7 | | | | | 1.000 | |
| | 4 | 0 | 0 | 5.0 | | | | | 1.511 | CYLINDRICAL LENS |
| | 5 | 0 | 0.08957 | 24.0 | | | | | 1.000 | |
| | 6 | 0 | 0 | 1.9 | | | | | 1.511 | POLYGON COVER GLASS |
| | 7 | 0 | 0 | 0.0 | | | | | 1.000 | |
| | 8 | 0 | 0 | 20.0 | | | | | | DEFLECTION SURFACE |
| POST-DEFLECTION OPTICAL SYSTEM | 9 | 0 | 0 | -6.8 | | | | | -1.000 | |
| | 10 | 0 | 0 | -1.9 | | | | | -1.511 | |
| | 11 | 0 | 0 | -25.1 | | | | | -1.000 | |
| | 12 | 0 | 0 | -4.8 | -275.5 | -275.4 | -276.1 | -274.6 | -1.503 | PLASTIC LENS, CURVED SURFACE POLYNOMIAL COEFFICIENT: TABLE1 |
| | 13 | 0 | 0 | | | | | | -1.000 | PLASTIC LENS, CURVED SURFACE POLYNOMIAL COEFFICIENT: TABLE2 |
| | 14 | 0 | 0 | -4.5 | | | | | -1.503 | PLASTIC LENS, CURVED SURFACE POLYNOMIAL COEFFICIENT: TABLE3 |
| | 15 | 0 | 0 | | | | | | -1.000 | PLASTIC LENS, CURVED SURFACE POLYNOMIAL COEFFICIENT: TABLE4 |
| | 16 | 0 | 0 | -27.3 | | | | | -1.000 | |
| | 17 | 0 | 0 | -1.9 | | | | | -1.511 | |
| | 18 | 0 | 0 | -38.0 | -38.0 | -39.3 | -36.0 | | -1.000 | |

GLASS(BK7):1.511
PLASTIC LENS:1.503

FIG.10

PARAXIAL POWER OF fθ1 PLASTIC LENS

| | CURVATURE OF PARAXIAL PART | | EACH SURFACE POWER | | EQUIVALENT SPACING | POWER OF PARAXIAL PART AS LENS | $\phi/\nu$ |
|---|---|---|---|---|---|---|---|
| | INCIDENT SURFACE | EXIT SURFACE | INCIDENT SURFACE | EXIT SURFACE | | | |
| MAIN SCAN | -1.324E-02 | -1.557E-02 | -6.66E-03 | 7.84E-03 | 6.49209589 | 0.001515697 | 9.1109E-06 |
| SUB SCAN | 2.832E-02 | 7.787E-03 | 1.43E-02 | -3.92E-03 | 6.49209589 | 0.010700677 | 6.43221E-05 |

PARAXIAL POWER OF fθ2 PLASTIC LENS

| | CURVATURE OF PARAXIAL PART | | EACH SURFACE POWER | | EQUIVALENT SPACING | POWER OF PARAXIAL PART AS LENS | $\phi/\nu$ |
|---|---|---|---|---|---|---|---|
| | INCIDENT SURFACE | EXIT SURFACE | INCIDENT SURFACE | EXIT SURFACE | | | |
| MAIN SCAN | -9.270E-04 | 2.101E-04 | -4.67E-04 | -1.06E-04 | 2.99306561 | -0.00057267 | -1.81614E-06 |
| SUB SCAN | -3.104E-03 | -3.888E-02 | -1.56E-03 | 1.96E-02 | 2.99306561 | 0.018105953 | 5.74203E-05 |

FIG. 11

DECENTRATION AND TILT DATA OF EACH LOCAL COORDINATE SYSTEM

| | | DECENTRATION | | | | | | | TILT ANGLE | | | |
|---|---|---|---|---|---|---|---|---|---|---|---|---|
| SURFACE No. | y DIRECTION | z DIRECTION | | | | ABOUT z AXIS | | ABOUT y AXIS | | | | |
| | COMMON | COMMON | RAY1 | RAY2 | RAY3 | RAY4 | COMMON | RAY1 | RAY2 | RAY3 | RAY4 | |
| PRE-DEFLECTION OPTICAL SYSTEM | | | | | | | | | | | | |
| 1 | | | | | | | | | | | | |
| 2 | | | | | | | | | | | | |
| 3 | | | | | | | | | | | | |
| 4 | | | | | | | | | | | | |
| 5 | | | | | | | | | | | | |
| 6 | | | | | | | −0.9808 | | | | | |
| 7 | | | | | | | | | | | | |
| 8 | −1.2 | | | | | | 0.9808 | | | | | |
| POST-DEFLECTION OPTICAL SYSTEM | | | | | | DEFLECTION SURFACE | | | | | | |
| 9 | | | | | | | −0.9808 | | | | | |
| 10 | | | | | | | | | | | | |
| 11 | | | | | | | | | | | | |
| 12 | | | | | | | | | | | | |
| 13 | | | | | | | | | | | | |
| 14 | | 10.2 | 2.0606 | −3.707 | −11.51 | | −0.0443 | −0.0074 | 0.0164 | 0.0449 | |
| 15 | | | | | | | | | | | | |
| 16 | | | | | | | 0.0294 | 0.0157 | 0.0057 | −0.0050 | | |
| 17 | | | | | | | | | | | | |
| 18 | | | | | | | | | | | | |

FIG.12

COEFFICIENT TABLE 1  COEFFICIENT VALUE OF $a_{lm}$

| m \ l | 0 | 1 | 2 | 3 | 4 | 5 | 6 |
|---|---|---|---|---|---|---|---|
| 0 | 0 | 1.63E-04 | 0.006619 | -3.07E-08 | -1.96E-07 | 2.41E-10 | 4.41E-11 |
| 2 | -0.01417 | -2.66E-04 | -1.13E-05 | 1.14E-07 | 7.50E-11 | 5.42E-11 | -6.69E-12 |
| 4 | 4.54E-05 | -8.46E-07 | -4.66E-08 | 5.81E-09 | -7.67E-11 | -3.08E-12 | 1.19E-13 |

COEFFICIENT TABLE 2  COEFFICIENT VALUE OF $a_{lm}$

| m \ l | 0 | 1 | 2 | 3 | 4 | 5 | 6 |
|---|---|---|---|---|---|---|---|
| 0 | 0 | 0.000913 | 0.007788 | 1.58E-07 | 1.58E-07 | 4.54E-11 | -3.23E-11 |
| 2 | -0.00389 | -2.23E-04 | -7.59E-06 | 6.00E-08 | -1.37E-09 | 2.94E-11 | -3.59E-12 |
| 4 | 8.15E-07 | -2.69E-06 | -3.83E-08 | 5.10E-09 | 1.93E-11 | -3.65E-12 | 1.69E-14 |

COEFFICIENT TABLE 3 COEFFICIENT VALUE OF $a_{lm}$

| m \ l | 0 | 1 | 2 | 3 | 4 | 5 | 6 |
|---|---|---|---|---|---|---|---|
| 0 | 0 | 0.010053 | 4.64E-04 | -2.55E-07 | -4.94E-10 | -3.31E-13 | -1.59E-13 |
| 2 | 0.001552 | 5.18E-06 | 1.71E-07 | 7.32E-12 | -2.78E-13 | -3.74E-15 | -4.84E-17 |
| 4 | 4.81E-06 | -4.44E-08 | -2.27E-10 | 4.59E-12 | -1.12E-14 | 1.04E-17 | -3.60E-19 |

COEFFICIENT TABLE 4  COEFFICIENT VALUE OF $a_{lm}$

| m \ l | 0 | 1 | 2 | 3 | 4 | 5 | 6 |
|---|---|---|---|---|---|---|---|
| 0 | 0 | 0.006326 | -1.05E-04 | -1.03E-08 | 2.02E-09 | -4.12E-12 | 2.40E-13 |
| 2 | 0.019464 | 4.33E-06 | -2.69E-08 | -5.48E-11 | 3.42E-13 | -1.00E-15 | 8.94E-17 |
| 4 | -3.39E-06 | 1.39E-08 | -1.10E-10 | 9.61E-15 | 5.52E-16 | 8.72E-17 | -5.67E-19 |

FIG. 16

DIAMETER OF INSCRIBED CIRCLE OF POLYGON MIRROR: 40.0
POSITION OF ROTATION CENTER OF POLYGON MIRROR: X 17.5  Y 9.7
(POSITION AS VIEWED FROM LOCAL COORDINATE SYSTEM OF POLYGON REFLECTOR SURFACE)
TILT ANGLE FROM CENTER OF ROTATION OF POLYGON MIRROR(rad):

| | $\theta_1$ | $\theta_2$ | $\theta_3$ | $\theta_4$ |
|---|---|---|---|---|
| | 0.02405 | −0.0097 | −0.0097 | 0.0096 |

IMAGE FORMING POSITION OF FINITE LENS: 1394.3

| | SURFACE No. | CURVATURE MAIN SCAN c4y | CURVATURE SUB SCAN c4z | TH COMMON | TH RAY1 | TH RAY2 | TH RAY3 | TH RAY4 | REFRACTIVE INDEX N | NOTES |
|---|---|---|---|---|---|---|---|---|---|---|
| PRE-DEFLECTION OPTICAL SYSTEM | 1 | 0 | 0.02405 | 33.5 | | | | | 1.000 | |
| | 2 | 0 | 0.0271 | 5.0 | | | | | 1.511 | CYLINDRICAL LENS |
| | 3 | 0 | 0 | 45.3 | | | | | 1.000 | |
| | 4 | 0 | 0.07482 | 3.0 | | | | | 1.511 | CYLINDRICAL LENS |
| | 5 | 0 | 0 | 34.0 | | | | | 1.000 | |
| | 6 | 0 | 0 | 1.9 | | | | | 1.511 | POLYGON COVER GLASS |
| | 7 | 0 | 0 | 0.0 | | | | | 1.000 | |
| | 8 | 0 | 0 | 20.0 | | | | | | DEFLECTION SURFACE |
| POST-DEFLECTION OPTICAL SYSTEM | 9 | 0 | 0 | | −6.8 | −6.8 | −6.8 | −6.8 | 1.000 | |
| | 10 | 0 | 0 | | −1.9 | −1.9 | −1.9 | −1.9 | 1.511 | |
| | 11 | 0 | 0 | | −25.0 | −25.0 | −25.0 | −25.0 | 1.000 | |
| | 12 | 0 | 0 | | −8.5 | −8.5 | −8.5 | −8.5 | 1.503 | PLASTIC LENS, CURVED SURFACE POLYNOMIAL COEFFICIENT:TABLE1 |
| | 13 | 0 | 0 | | −286.4 | −286.9 | −286.3 | −286.0 | 1.000 | PLASTIC LENS, CURVED SURFACE POLYNOMIAL COEFFICIENT:TABLE2 |
| | 14 | 0 | 0 | | −6.0 | −6.0 | −6.0 | −6.0 | 1.503 | PLASTIC LENS, CURVED SURFACE POLYNOMIAL COEFFICIENT:TABLE3 |
| | 15 | 0 | 0 | | −28.9 | −28.9 | −28.9 | −28.9 | 1.000 | PLASTIC LENS, CURVED SURFACE POLYNOMIAL COEFFICIENT:TABLE4 |
| | 16 | 0 | 0 | | −1.9 | −1.9 | −1.9 | −1.9 | 1.511 | |
| | 17 | 0 | 0 | | −38.5 | −39.0 | −38.5 | −38.8 | 1.000 | |

GLASS(BK7):1.511
PLASTIC LENS: 1.503

FIG.17

PARAXIAL POWER OF fθ1 PLASTIC LENS

| | CURVATURE OF PARAXIAL PART | | EACH SURFACE POWER | | EQUIVALENT SPACING | POWER OF PARAXIAL PART AS LENS | $\phi/\nu$ |
|---|---|---|---|---|---|---|---|
| | INCIDENT SURFACE | EXIT SURFACE | INCIDENT SURFACE | EXIT SURFACE | | | |
| MAIN SCAN | -1.170E-02 | -1.535E-02 | -5.89E-03 | 7.73E-03 | 5.65122049 | 0.002098533 | 1.26143E-05 |
| SUB SCAN | 4.154E-02 | 1.441E-02 | 2.09E-02 | -7.25E-03 | 5.65122049 | 0.014517613 | 8.72658E-05 |

PARAXIAL POWER OF fθ2 PLASTIC LENS

| | CURVATURE OF PARAXIAL PART | | EACH SURFACE POWER | | EQUIVALENT SPACING | POWER OF PARAXIAL PART AS LENS | $\phi/\nu$ |
|---|---|---|---|---|---|---|---|
| | INCIDENT SURFACE | EXIT SURFACE | INCIDENT SURFACE | EXIT SURFACE | | | |
| MAIN SCAN | -6.976E-04 | 1.666E-04 | -3.51E-04 | -8.39E-05 | 3.98843528 | -0.000435199 | -1.38017E-06 |
| SUB SCAN | -2.672E-02 | -5.957E-02 | -1.35E-02 | 3.00E-02 | 3.98843528 | 0.018149876 | 5.75596E-05 |

FIG.18

DECENTRATION AND TILT DATA OF EACH LOCAL COORDINATE SYSTEM

| SURFACE No. | DECENTRATION | | | | | | TILT ANGLE | | | | |
|---|---|---|---|---|---|---|---|---|---|---|---|
| | y DIRECTION | z DIRECTION | | | | | ABOUT z AXIS | ABOUT y AXIS | | | |
| | COMMON | COMMON | RAY1 | RAY2 | RAY3 | RAY4 | COMMON | RAY1 | RAY2 | RAY3 | RAY4 |
| PRE-DEFLECTION OPTICAL SYSTEM | | | | | | | | | | | |
| 1 | | | | | | | | | | | |
| 2 | | | | | | | | | | | |
| 3 | | | | | | | | | | | |
| 4 | | | | | | | | | | | |
| 5 | | | | | | | | | | | |
| 6 | | | | | | | -0.9748 | | | | |
| 7 | | | | | | | 0.9748 | | | | |
| 8 | -1.2 | | | | | | | | | | |
| DEFLECTION SURFACE | | | | | | | | | | | |
| 9 | | | | | | | -0.9748 | | | | |
| POST-DEFLECTION OPTICAL SYSTEM | | | | | | | | | | | |
| 10 | | | | | | | | | | | |
| 11 | | | | | | | | | | | |
| 12 | | | | | | | | | | | |
| 13 | | | | | | | | | | | |
| 14 | | | 8.7 | 2.9424 | -1.558 | -6.996 | | | | | |
| 15 | | | | | | | | | | | |
| 16 | | | | | | | | -0.0298 | -0.0101 | 0.0061 | 0.0250 |
| 17 | | | | | | | | 0.0071 | -0.0126 | -0.0227 | -0.0327 |
| 18 | | | | | | | | | | | |

FIG.19

COEFFICIENT TABLE 1  COEFFICIENT VALUE OF a$_{lm}$

| m\l | 0 | 1 | 2 | 3 | 4 | 5 | 6 | 7 | 8 |
|---|---|---|---|---|---|---|---|---|---|
| 0 | 0 | 4.46E-03 | 0.0058489 | -2.88E-07 | -4.78E-07 | 3.42E-10 | 5.14E-15 | -3.87E-16 |
| 2 | -0.020796 | -2.24E-04 | -7.64E-06 | 2.65E-07 | -3.16E-09 | -5.47E-12 | 2.33E-15 | 5.54E-18 |
| 4 | -1.72E-05 | -1.59E-08 | -9.31E-10 | -5.29E-09 | 1.16E-10 | 5.50E-12 | -5.13E-14 | 2.03E-16 | 1.61E-17 |
| 6 | 6.15E-08 | 2.56E-09 | -3.38E-11 | 3.28E-12 | -8.26E-14 | -1.65E-15 | -5.35E-17 | -5.13E-18 | -1.94E-20 |

COEFFICIENT TABLE 2  COEFFICIENT VALUE OF a$_{lm}$

| m\l | 0 | 1 | 2 | 3 | 4 | 5 | 6 | 7 | 8 |
|---|---|---|---|---|---|---|---|---|---|
| 0 | 0 | 0.002041 | 0.0076782 | -4.67E-07 | -7.67E-09 | -4.98E-10 | -5.90E-11 | -1.59E-15 | -2.50E-17 |
| 2 | -0.007204 | -2.03E-04 | -5.41E-06 | 1.46E-07 | 9.75E-12 | -1.50E-10 | -2.01E-12 | -6.79E-16 | 9.34E-18 |
| 4 | -1.54E-05 | -2.97E-07 | -7.02E-08 | -3.21E-09 | 1.71E-10 | 2.75E-12 | -6.75E-14 | -1.46E-16 | 1.09E-17 |
| 6 | 5.16E-08 | 2.84E-09 | 2.88E-11 | 2.55E-12 | -5.79E-14 | -3.27E-16 | -5.63E-17 | -1.69E-18 | -2.94E-20 |

COEFFICIENT TABLE 3  COEFFICIENT VALUE OF a$_{lm}$

| m\l | 0 | 1 | 2 | 3 | 4 | 5 | 6 | 7 | 8 |
|---|---|---|---|---|---|---|---|---|---|
| 0 | 0 | 0.0023232 | 3.49E-04 | -6.21E-08 | -1.61E-08 | 2.95E-12 | 2.15E-13 | -1.35E-18 | -6.80E-20 |
| 2 | 0.0133659 | 4.59E-06 | -1.77E-07 | 2.00E-10 | -2.11E-11 | -1.95E-15 | 3.66E-16 | 2.07E-22 | 1.42E-23 |
| 4 | -7.85E-06 | -9.69E-08 | 5.06E-10 | 8.13E-12 | 1.94E-14 | 1.07E-16 | 1.90E-18 | -1.31E-23 | 1.51E-24 |
| 6 | -3.54E-08 | 2.49E-12 | -1.08E-13 | -1.39E-15 | -1.71E-17 | -1.58E-19 | -8.18E-22 | -6.87E-24 | -1.15E-26 |

COEFFICIENT TABLE 4  COEFFICIENT VALUE OF a$_{lm}$

| m\l | 0 | 1 | 2 | 3 | 4 | 5 | 6 | 7 | 8 |
|---|---|---|---|---|---|---|---|---|---|
| 0 | 0 | -0.001651 | -8.33E-05 | 2.16E-08 | -1.20E-08 | 2.72E-12 | 4.45E-13 | -1.12E-18 | 1.60E-20 |
| 2 | 0.0298651 | 3.14E-06 | -4.20E-07 | 1.85E-10 | -7.21E-12 | 7.80E-16 | 1.97E-16 | 4.43E-22 | 4.61E-24 |
| 4 | -2.17E-05 | 4.93E-08 | 4.93E-10 | -4.27E-12 | 4.23E-14 | 1.18E-16 | 1.68E-18 | 4.96E-23 | -4.83E-26 |
| 6 | 1.86E-08 | -3.03E-11 | -2.86E-13 | -1.23E-16 | -2.32E-17 | 3.85E-20 | -8.96E-22 | 1.16E-24 | -7.63E-26 |

FIG. 25

DIAMETER OF INSCRIBED CIRCLE OF POLYGON MIRROR: 40.0

POSITION OF ROTATION CENTER OF POLYGON MIRROR: X 17.5, Y 8.6
(POSITION AS VIEWED FROM LOCAL COORDINATE SYSTEM OF POLYGON REFLECTION SURFACE)

TILT ANGLE FROM CENTER OF ROTATION OF POLYGON MIRROR (rad)

| $\theta_1$ | $\theta_2$ | $\theta_3$ | $\theta_4$ |
|---|---|---|---|
| 0.030 | -0.010 | -0.030 | 0.008 |

IMAGE FORMING POSITION OF FINITE LENS: 843.2

| SURFACE No. | CURVATURE | | TH | | | | REFRACTIVE INDEX N | NOTES |
|---|---|---|---|---|---|---|---|---|
| | MAIN SCAN CBY | SUB SCAN CBZ | COMMON | RAY1 | RAY2 | RAY3 | RAY4 | | |
| 1 | 0 | 0 | 33.3 | | | | | 1.000 | |
| 2 | 0.015075 | 0 | 5.0 | | | | | 1.511 | CYLINDRICAL LENS |
| 3 | 0 | 0 | 86.8 | | | | | 1.000 | |
| 4 | 0 | 0 | 5.0 | | | | | 1.511 | CYLINDRICAL LENS |
| 5 | 0 | 0.067847 | 24.0 | | | | | 1.000 | |
| 6 | 0 | 0 | 1.9 | | | | | 1.511 | POLYGON COVER GLASS |
| 7 | 0 | 0 | 0.0 | | | | | 1.000 | |
| 8 | 0 | 0 | 20.0 | | | | | 1.000 | DEFLECTION SURFACE |
| 9 | 0 | 0 | -6.8 | | | | | -1.000 | |
| 10 | 0 | 0 | -1.9 | | | | | 1.511 | PLASTIC LENS, CURVED SURFACE POLYNOMIAL COEFFICIENT: TABLE1 |
| 11 | 0 | 0 | -25.2 | -269.0 | -267.9 | -267.8 | -267.3 | -1.000 | PLASTIC LENS, CURVED SURFACE POLYNOMIAL COEFFICIENT: TABLE2 |
| 12 | 0 | 0 | -7.4 | | | | | -1.000 | |
| 13 | 0 | 0 | 0 | | | | | 1.503 | PLASTIC LENS, CURVED SURFACE POLYNOMIAL COEFFICIENT: TABLE3 |
| 14 | 0 | 0 | -4.5 | | | | | 1.503 | |
| 15 | 0 | 0 | 0 | | | | | 1.000 | PLASTIC LENS, CURVED SURFACE POLYNOMIAL COEFFICIENT: TABLE4 |
| 16 | 0 | 0 | -26.3 | | | | | -1.000 | |
| 17 | 0 | 0 | -1.9 | | | | | 1.511 | |
| 18 | 0 | 0 | -37.8 | -38.0 | -38.2 | -38.5 | | | |

PRE-DEFLECTION OPTICAL SYSTEM (surfaces 1–8)
POST-DEFLECTION OPTICAL SYSTEM (surfaces 9–18)

GLASS (BK7): 1.511
PLASTIC LENS: 1.503

FIG.26

PARAXIAL POWER OF fθ1 PLASTIC LENS

| | CURVATURE OF PARAXIAL PART | | EACH SURFACE POWER | | EQUIVALENT SPACING | POWER OF PARAXIAL PART AS LENS | φ/ν |
|---|---|---|---|---|---|---|---|
| | INCIDENT SURFACE | EXIT SURFACE | INCIDENT SURFACE | EXIT SURFACE | | | |
| MAIN SCAN | -1.280E-02 | -1.504E-02 | -6.44E-03 | 7.57E-03 | 4.90785538 | 0.001369436 | 8.23172E-06 |
| SUB SCAN | 2.411E-02 | 4.015E-03 | 1.21E-02 | -2.02E-03 | 4.90785538 | 0.010239628 | 6.15507E-05 |

PARAXIAL POWER OF fθ2 PLASTIC REFRACTIVE LENS

| | CURVATURE OF PARAXIAL PART | | EACH SURFACE POWER | | EQUIVALENT SPACING | POWER OF PARAXIAL PART AS LENS | φ/ν |
|---|---|---|---|---|---|---|---|
| | INCIDENT SURFACE | EXIT SURFACE | INCIDENT SURFACE | EXIT SURFACE | | | |
| MAIN SCAN | -3.493E-04 | 1.029E-04 | -1.76E-04 | -5.18E-05 | 2.99306561 | -0.000227698 | -7.22111E-07 |
| SUB SCAN | -3.286E-02 | -6.666E-02 | -1.65E-02 | 3.36E-02 | 2.99306561 | 0.018682904 | 5.92501E-05 |

PARAXIAL POWER OF DIFFRACTION ELEMENT

| | DIFFRACTION SURFACE POWER | | φ/ν |
|---|---|---|---|
| | INCIDENT SURFACE | EXIT SURFACE | |
| MAIN SCAN | – | 9.15E-08 | -1.87241E-07 |
| SUB SCAN | – | 1.48E-06 | -3.0208E-06 |

-92.8571

PARAXIAL POWER OF fθ2 PLASTIC LENS (COMBINATION OF REFRACTIVE LENS AND DIFFRACTIVE LENS)

| | EACH SURFACE POWER | | EQUIVALENT SPACING | POWER OF PARAXIAL PART AS LENS | Σ φ/ν |
|---|---|---|---|---|---|
| | INCIDENT SURFACE | EXIT SURFACE | | | |
| MAIN SCAN | -1.76E-04 | -5.17E-05 | 2.99306561 | -0.000227579 | -9.09352E-07 |
| SUB SCAN | -1.65E-02 | 3.36E-02 | 2.99306561 | 0.017022497 | 5.62293E-05 |

FIG.27

DECENTRATION AND TILT DATA OF EACH LOCAL COORDINATE SYSTEM

| SURFACE No. | DECENTRATION | | | | | | | TILT ANGLE | | | | | |
|---|---|---|---|---|---|---|---|---|---|---|---|---|---|
| | y DIRECTION | z DIRECTION | | | | ABOUT z AXIS | | ABOUT y AXIS | | | | | |
| | COMMON | COMMON | RAY1 | RAY2 | RAY3 | RAY4 | COMMON | RAY1 | RAY2 | RAY3 | RAY4 | | |
| 1 | | | | | | | | | | | | | |
| 2 | | | | | | | | | | | | | |
| 3 | | | | | | | | | | | | | |
| 4 | | | | | | | | | | | | | |
| 5 | | | | | | | | | | | | | |
| 6 | | | | | | | −0.9629 | | | | | | |
| 7 | | | | | | | 0.9629 | | | | | | |
| 8 | −1.2 | | | | | | | | | | | | |
| 9 | | | | | | | −0.9629 | | | | | | |
| 10 | | | | | | | | | | | | | |
| 11 | | | | | | | | | | | | | |
| 12 | | | | | | | | | | | | | |
| 13 | | | | | | | | | | | | | |
| 14 | | | 9.5 | 2.0241 | −3.495 | −10.81 | | | | | | | |
| 15 | | | | | | | | | | | | | |
| 16 | | | | | | | | −0.0335 | −0.0083 | 0.0099 | 0.0351 | | |
| 17 | | | | | | | | 0.0253 | 0.0163 | 0.0098 | −0.0009 | | |
| 18 | | | | | | | | | | | | | |

Rows 1–8: PRE-DEFLECTION OPTICAL SYSTEM
Rows 9–18: POST-DEFLECTION OPTICAL SYSTEM
(Row 9: DEFLECTION SURFACE)

FIG.28

COEFFICIENT TABLE 1  COEFFICIENT VALUE OF alm

| m \ l | 0 | 1 | 2 | 3 | 4 | 5 | 6 |
|---|---|---|---|---|---|---|---|
| 0 | 0 | 0.001516 | 0.006399 | -7.9E-08 | -1.4E-07 | 6.86E-11 | 3.1E-11 |
| 2 | -0.01206 | -0.00035 | -1.1E-05 | 5.21E-08 | 5.08E-10 | 8.73E-11 | -7.5E-13 |
| 4 | 4.13E-05 | -3E-07 | -3.4E-08 | 2.28E-09 | -5.1E-11 | -9.6E-13 | 4.67E-14 |

COEFFICIENT TABLE 2  COEFFICIENT VALUE OF alm

| m \ l | 0 | 1 | 2 | 3 | 4 | 5 | 6 |
|---|---|---|---|---|---|---|---|
| 0 | 0 | 0.0023 | 0.007521 | 1.63E-07 | 1.16E-07 | -1.9E-11 | -3.1E-12 |
| 2 | -0.00201 | -0.00029 | -7.9E-06 | 2.58E-08 | -9E-10 | 3.65E-11 | -1.3E-12 |
| 4 | 3.68E-06 | -1.8E-06 | 1.33E-09 | 1.79E-09 | -1.9E-11 | -1E-12 | 2.69E-14 |

COEFFICIENT TABLE 3 COEFFICIENT VALUE OF alm

| m \ l | 0 | 1 | 2 | 3 | 4 | 5 | 6 |
|---|---|---|---|---|---|---|---|
| 0 | 0 | 0.001222 | 0.000175 | -6.2E-08 | -1E-11 | 3.21E-13 | -5.5E-14 |
| 2 | 0.016442 | 5.71E-06 | 2.03E-07 | 2.54E-11 | -4.7E-13 | -1.2E-15 | -7.3E-17 |
| 4 | 4.59E-06 | -3.9E-08 | 5.2E-11 | 6.63E-13 | 3.09E-15 | 1.18E-17 | -4E-19 |

COEFFICIENT TABLE 4  COEFFICIENT VALUE OF alm

| m \ l | 0 | 1 | 2 | 3 | 4 | 5 | 6 |
|---|---|---|---|---|---|---|---|
| 0 | 0 | 6.23E-05 | -5.1E-05 | -2E-09 | 1.37E-09 | -4.6E-13 | 9.34E-14 |
| 2 | 0.033444 | 5.35E-06 | -3.8E-08 | -2.7E-11 | 3.44E-13 | 2.04E-16 | 5.57E-17 |
| 4 | -3.4E-06 | 1.85E-08 | -4.6E-11 | -4.9E-13 | -5.7E-16 | -8.4E-18 | 2.67E-19 |

COEFFICIENT TABLE 4  COEFFICIENT OF OPTICAL PATH DIFFERENCE FUNCTION clm

| m \ l | 0 | 1 | 2 | 3 | 4 |
|---|---|---|---|---|---|
| 0 | 0 | 1.13E-06 | -4.6E-08 | -3E-11 | -3.4E-13 |
| 2 | -7.4E-07 | 1.87E-09 | 6.82E-12 | 5.84E-14 | 2.99E-16 |
| 4 | 6.29E-09 | 1.02E-10 | 5.21E-13 | 3.87E-15 | 1.93E-17 |
| 6 | 6.13E-10 | 3.52E-12 | 2.42E-14 | 9.86E-17 | 7.32E-19 |

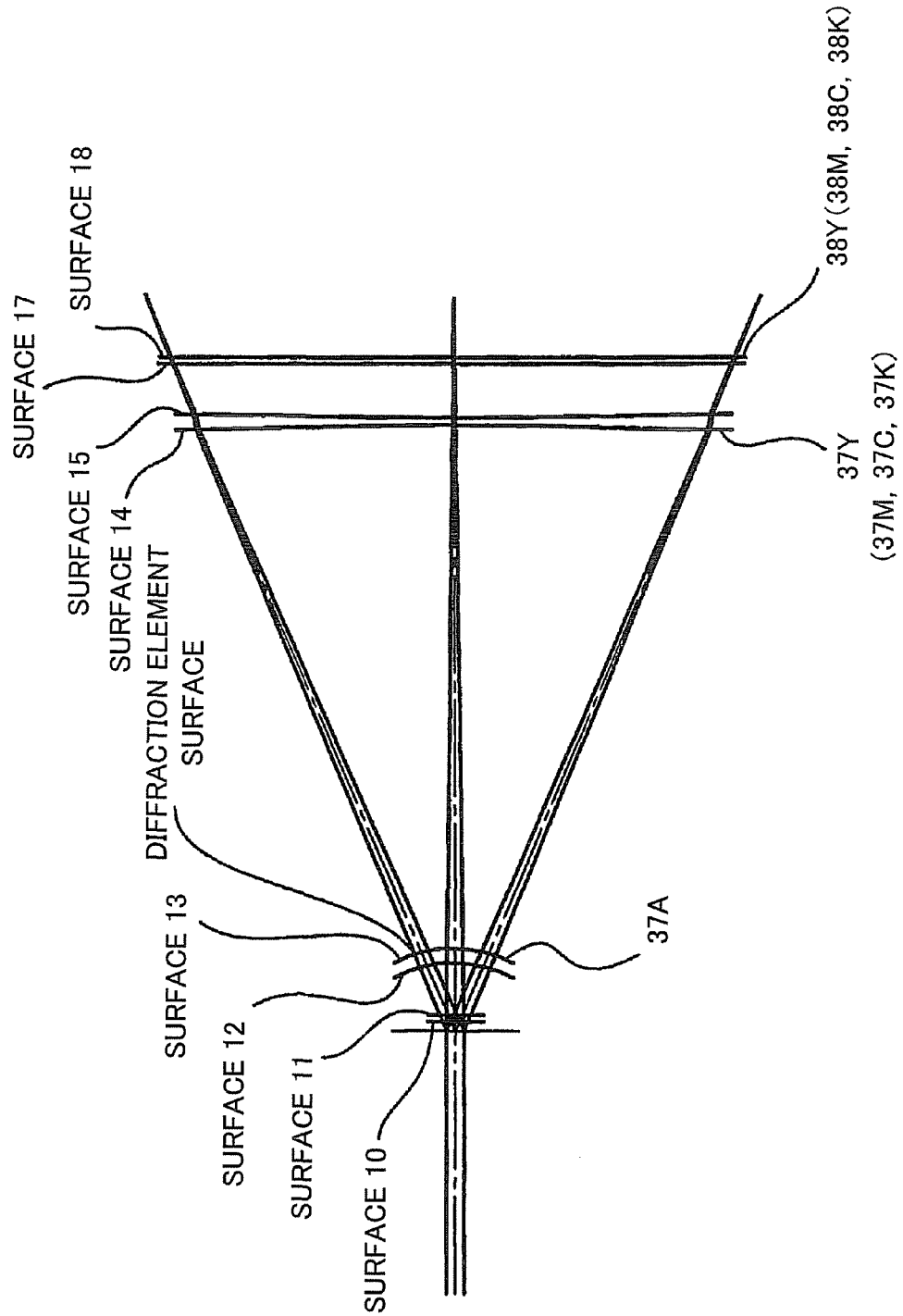

FIG.31

DIAMETER OF INSCRIBED CIRCLE OF POLYGON MIRROR: 40.0
POSITION OF ROTATION CENTER OF POLYGON MIRROR: X 17.5, Y 9.8
(POSITION AS VIEWED FROM LOCAL COORDINATE SYSTEM OF POLYGON REFLECTION SURFACE)
TILT ANGLE FROM CENTER OF ROTATION OF POLYGON MIRROR (rad)

| | $\theta_1$ | $\theta_2$ | $\theta_3$ | $\theta_4$ |
|---|---|---|---|---|
| | 0.023835 | −0.0082 | −0.03 | 0.0082 |

IMAGE FORMING POSITION OF FINITE LENS: 807.6

| SURFACE No. | CURVATURE MAIN SCAN Cy | SUB SCAN Cz | COMMON | RAY1 | RAY2 | RAY3 | RAY4 | TH | REFRACTIVE INDEX N | NOTES |
|---|---|---|---|---|---|---|---|---|---|---|
| 1 | 0 | 0 | 33.3 | | | | | | 1.000 | |
| 2 | 0.016434 | 0 | 5.0 | | | | | | 1.511 | CYLINDRICAL LENS |
| 3 | 0 | 0 | 80.1 | | | | | | 1.000 | |
| 4 | 0 | 0 | 3.0 | | | | | | 1.511 | CYLINDRICAL LENS |
| 5 | 0.016335 | 0 | 24.0 | | | | | | 1.000 | |
| 6 | 0 | 0 | 1.9 | | | | | | 1.511 | POLYGON COVER GLASS |
| 7 | 0 | 0 | 0.0 | | | | | | 1.000 | |
| 8 | 0 | 0 | 30.0 | | | | | | | DEFLECTION SURFACE |
| 9 | 0 | 0 | −6.8 | | | | | | −1.000 | |
| 10 | 0 | 0 | −1.9 | | | | | | −1.511 | |
| 11 | 0 | 0 | −25.1 | | | | | | −1.000 | |
| 12 | 0 | 0 | −7.5 | −287.2 | −287.0 | −286.8 | −286.5 | | −1.503 | PLASTIC LENS, CURVED SURFACE POLYNOMIAL COEFFICIENT-TABLE1 |
| 13 | 0 | 0 | | | | | | | −1.000 | PLASTIC LENS, CURVED SURFACE POLYNOMIAL COEFFICIENT-TABLE2 |
| 14 | 0 | 0 | −4.5 | | | | | | −1.503 | PLASTIC LENS, CURVED SURFACE POLYNOMIAL COEFFICIENT-TABLE3 |
| 15 | 0 | 0 | | | | | | | −1.000 | PLASTIC LENS, CURVED SURFACE POLYNOMIAL COEFFICIENT-TABLE4 |
| 16 | 0 | 0 | −26.4 | −37.9 | −38.0 | −38.2 | −38.5 | | −1.000 | |
| 17 | 0 | 0 | −1.9 | | | | | | −1.511 | |
| 18 | 0 | 0 | | | | | | | −1.000 | |

PRE-DEFLECTION OPTICAL SYSTEM (rows 1–8)
POST-DEFLECTION OPTICAL SYSTEM (rows 9–18)

GLASS (BK7): 1.511
PLASTIC LENS: 1.503

FIG.32

PARAXIAL POWER OF fθ1 PLASTIC REFRACTIVE LENS

| | CURVATURE OF PARAXIAL PART | | EACH SURFACE POWER | | EQUIVALENT SPACING | POWER OF PARAXIAL PART AS LENS | $\phi/\nu$ |
|---|---|---|---|---|---|---|---|
| | INCIDENT SURFACE | EXIT SURFACE | INCIDENT SURFACE | EXIT SURFACE | | | |
| MAIN SCAN | -1.258E-02 | -1.506E-02 | -6.33E-03 | 7.58E-03 | 4.97864143 | 0.001490887 | 8.96176E-06 |
| SUB SCAN | 2.436E-02 | 3.975E-03 | 1.23E-02 | -2.00E-03 | 4.97864143 | 0.010384436 | 6.24211E-05 |

PARAXIAL POWER OF DIFFRACTION ELEMENT

| | DIFFRACTION SURFACE POWER | | $\phi/\nu$ |
|---|---|---|---|
| | INCIDENT SURFACE | EXIT SURFACE | |
| MAIN SCAN | - | 1.53E-07 | -1.64316E-09 |
| SUB SCAN | - | 3.86E-05 | -4.15163E-07 |

PARAXIAL POWER OF fθ1 PLASTIC LENS (COMBINATION OF REFRACTIVE LENS AND DIFFRACTIVE LENS)

| | EACH SURFACE POWER | | EQUIVALENT SPACING | POWER OF PARAXIAL PART AS LENS | $\Sigma \phi/\nu$ |
|---|---|---|---|---|---|
| | INCIDENT SURFACE | EXIT SURFACE | | | |
| MAIN SCAN | -6.33E-03 | 7.58E-03 | 4.97864143 | 0.00125195 | 8.96012E-06 |
| SUB SCAN | 1.23E-02 | -1.96E-03 | 4.97864143 | 0.0103008 | 6.2006E-05 |

PARAXIAL POWER OF fθ2 PLASTIC LENS

| | CURVATURE OF PARAXIAL PART | | EACH SURFACE POWER | | EQUIVALENT SPACING | POWER OF PARAXIAL PART AS LENS | $\phi/\nu$ |
|---|---|---|---|---|---|---|---|
| | INCIDENT SURFACE | EXIT SURFACE | INCIDENT SURFACE | EXIT SURFACE | | | |
| MAIN SCAN | -4.152E-04 | 1.398E-04 | -2.09E-04 | -7.04E-05 | 2.99306561 | -0.000279483 | -8.86338E-07 |
| SUB SCAN | -2.907E-02 | -6.325E-02 | -1.46E-02 | 3.18E-02 | 2.99306561 | 0.018602157 | 5.8994E-05 |

FIG. 33

DECENTRATION AND TILT DATA OF EACH LOCAL COORDINATE SYSTEM

| SURFACE No. | DECENTRATION ||||||| TILT ANGLE |||||
|---|---|---|---|---|---|---|---|---|---|---|---|
| | y DIRECTION | z DIRECTION |||| ABOUT z AXIS | ABOUT y AXIS ||||
| | COMMON | COMMON | RAY1 | RAY2 | RAY3 | RAY4 | COMMON | RAY1 | RAY2 | RAY3 | RAY4 |
| 1 | | | | | | | | | | | |
| 2 | | | | | | | | | | | |
| 3 | | | | | | | | | | | |
| 4 | | | | | | | | | | | |
| 5 | | | | | | | | | | | |
| 6 | | | | | | | −0.9658 | | | | |
| 7 | | | | | | | 0.9658 | | | | |
| 8 | −1.2 | | | | | | | | | | |
| 9 | | | | | | | −0.9658 | | | | |
| 10 | | | | | | | | | | | |
| 11 | | | | | | | | | | | |
| 12 | | | | | | | | | | | |
| 13 | | | DEFLECTION SURFACE ||||||||||
| 14 | | | 9.5 | 2.0431 | −3.411 | −10.75 | | | | | |
| 15 | | | | | | | | | | | |
| 16 | | | | | | | | −0.0335 | −0.0082 | 0.0100 | 0.0351 |
| 17 | | | | | | | | 0.0257 | 0.0160 | 0.0080 | −0.0029 |
| 18 | | | | | | | | | | | |

PRE-DEFLECTION OPTICAL SYSTEM: surfaces 1–8
POST-DEFLECTION OPTICAL SYSTEM: surfaces 9–18

FIG.34

COEFFICIENT TABLE 1  COEFFICIENT VALUE OF $a_{lm}$

| m\l | 0 | 1 | 2 | 3 | 4 | 5 | 6 | 7 | 8 |
|---|---|---|---|---|---|---|---|---|---|
| 0 | 0 | 1.41E-03 | 0.0062892 | -7.04E-08 | -1.48E-07 | 5.90E-11 | 3.53E-11 | -2.71E-15 | 1.08E-15 |
| 2 | -0.012184 | -3.44E-04 | -1.10E-05 | 5.64E-08 | 4.58E-10 | 8.69E-11 | -9.49E-13 | -2.53E-15 | -6.88E-17 |
| 4 | 4.01E-05 | -4.06E-08 | -3.84E-08 | 2.11E-09 | -4.39E-11 | -1.42E-12 | 7.05E-14 | -9.50E-17 | -7.67E-18 |
| 6 | -7.25E-08 | -4.68E-10 | 1.08E-10 | -9.12E-13 | 7.40E-14 | -5.33E-16 | -1.98E-17 | 2.46E-19 | -6.08E-20 |

COEFFICIENT TABLE 2  COEFFICIENT VALUE OF $a_{lm}$

| m\l | 0 | 1 | 2 | 3 | 4 | 5 | 6 | 7 | 8 |
|---|---|---|---|---|---|---|---|---|---|
| 0 | 0 | 0.0022841 | 0.0075329 | 1.61E-07 | 1.25E-07 | -3.65E-12 | -3.69E-12 | -1.36E-15 | -1.94E-16 |
| 2 | -0.001987 | -2.89E-04 | -7.84E-06 | 2.57E-08 | -9.00E-10 | 3.88E-11 | -1.35E-12 | 6.25E-16 | 4.19E-18 |
| 4 | 4.47E-06 | -2.30E-06 | 4.20E-09 | 1.80E-09 | -2.32E-11 | -2.00E-12 | 2.46E-14 | 2.34E-17 | 3.56E-18 |
| 6 | -1.15E-07 | 9.88E-10 | -3.07E-10 | -2.69E-12 | -3.68E-13 | -1.90E-14 | -6.24E-16 | -1.95E-17 | -1.64E-18 |

COEFFICIENT TABLE 2  COEFFICIENT OF OPTICAL PATH DIFFERENCE FUNCTION $c_{lm}$

| m\l | 0 | 1 | 2 | 3 | 4 |
|---|---|---|---|---|---|
| 0 |  |  | -2.54E-06 | -7.63E-08 | 5.126E-12 |
| 2 | -1.93E-05 | 8.281E-07 | -3.65E-08 | 3.501E-09 | -1.28E-11 |
| 4 | 4.46E-06 | -5.91E-08 | -1.04E-09 | -8.37E-11 | -4.78E-12 |
| 6 | -4.8E-07 | 5.903E-08 | -3.03E-10 | 1.703E-10 | 1.57E-12 |
|   |           |           |           | 2.955E-11 |           |

COEFFICIENT TABLE 3  COEFFICIENT VALUE OF $a_{lm}$

| m\l | 0 | 1 | 2 | 3 | 4 | 5 | 6 | 7 | 8 |
|---|---|---|---|---|---|---|---|---|---|
| 0 | 0 | 0.0015469 | 2.08E-04 | -6.58E-08 | 4.17E-11 | 4.62E-13 | -6.52E-14 | -7.64E-19 | -3.90E-21 |
| 2 | 0.0145441 | 5.66E-06 | 2.04E-07 | 2.94E-11 | -4.79E-13 | -1.28E-15 | -8.01E-17 | -5.87E-22 | -1.64E-23 |
| 4 | 4.78E-06 | -4.42E-08 | -7.49E-12 | 9.35E-13 | 4.16E-15 | 1.28E-17 | -4.83E-19 | -1.16E-22 | -9.61E-25 |
| 6 | -1.27E-08 | 9.76E-12 | -3.53E-13 | 1.83E-15 | -6.68E-18 | 1.20E-19 | -1.61E-22 | 7.40E-24 | -1.58E-26 |

COEFFICIENT TABLE 4  COEFFICIENT VALUE OF $a_{lm}$

| m\l | 0 | 1 | 2 | 3 | 4 | 5 | 6 | 7 | 8 |
|---|---|---|---|---|---|---|---|---|---|
| 0 | 0 | -1.38E-05 | -6.99E-05 | 7.51E-09 | 1.76E-09 | -5.14E-13 | 1.14E-13 | -3.04E-18 | 1.67E-20 |
| 2 | 0.0317188 | 5.36E-06 | -3.98E-08 | -3.13E-11 | 3.50E-13 | 2.51E-16 | 6.13E-17 | 4.68E-23 | 9.74E-24 |
| 4 | -4.17E-06 | 1.90E-08 | -4.16E-11 | -6.54E-13 | -1.55E-15 | -5.80E-18 | 2.72E-19 | 5.69E-23 | -1.19E-25 |
| 6 | 2.42E-09 | -1.63E-11 | 3.49E-14 | -1.44E-15 | 3.72E-19 | -6.20E-20 | -8.12E-24 | -2.09E-24 | -8.28E-27 |

…

LIGHT SCANNING DEVICE AND THRUST-DIRECTION FORCE CANCELING METHOD

CROSS-REFERENCE TO RELATED APPLICATIONS

This application is a Division of application Ser. No. 12/023,674 filed on Jan. 31, 2008 now U.S. Pat. No. 8,027,076, the entire contents of which are incorporated herein by reference.

This application claims the benefit of U.S. Provisional Application No. 60/887,502 filed Jan. 31, 2007, the entire contents of which are incorporated herein by reference.

BACKGROUND OF THE INVENTION

1. Field of the Invention

The present invention relates to a light scanning technique of reflecting and deflecting incident light by a rotary deflector, and particularly a technique of reducing the influence of a thrust-direction force generated by air resistance received by a reflection surface of the rotary deflector.

2. Description of the Related Art

Traditionally, there has been known a technique of causing a luminous flux from a light source to scan the photoconductive surface of each of the plural photoconductors by using a rotary deflector and thus forming an image such as an electrostatic latent image on the photoconductors.

In the traditional technique, plural reflection surfaces of the rotary deflector which carries out scanning of the plural photoconductors with a light beam are tilted in the same direction with respect to the rotation axis (see, for example, JP-A-2000-2846).

In the traditional technique, since the plural reflection surfaces of the rotary deflector are tilted in the same direction with respect to the rotation axis, a deviated thrust-direction force directed toward one of the directions of rotation axis (thrust directions) is generated by the influence of air resistance when the rotary deflector rotates.

In such a traditional light scanning technique, the rotary deflector may be driven at plural patterns of rotation speeds in order to deal with different printing speeds, and the force applied in the axial direction is changed by the variance in the rotation speed. Such variance in the thrust-direction force causes change in the position in the axial direction of the rotary deflector and hence may cause variance in optical characteristics.

Also, in circumstances where the position in the direction of rotation axis of the rotary deflector changes in this manner, it is necessary to secure a broad effective reflection area in the axial direction of the rotary deflector (to increase size of the rotary deflector in the direction of rotation axis) in order to make a luminous flux incident in the effective reflection area on the reflection surfaces of the rotary deflector even when the change in the position has occurred.

Such expansion of the effective reflection range of the rotary deflector increases windage loss at the time when the rotary deflector rotates, and thus increases motor load and noise.

The change in the position in the direction of rotation axis of the rotary deflector as described above can be restrained if a bearing or the like that can deal with the thrust-direction force is employed. However, there is a problem that the device becomes expensive.

SUMMARY OF THE INVENTION

It is an object of an aspect of the invention to provide a technique of reducing adverse effects of a thrust-direction force generated by air resistance received by reflection surfaces of a rotary deflector, in a light scanning technique to reflect and deflect incident light by the rotary deflector.

A light scanning device according to an aspect of the invention includes: a rotary deflector configured to reflect and deflect an incident luminous flux by plural reflection surfaces arrayed in a rotating direction and thus cause the incident luminous flux to scan a predetermined direction, in which at least one of the plural reflection surfaces is tilted with respect to the rotation axis of the rotary deflector; and a thrust-direction force canceling unit supported in a rotatable manner integrally with the plural reflection surfaces of the rotary deflector, and having a wind receiving surface tilted with respect to the rotation axis of the rotary deflector in a direction opposite to at least one surface of the reflection surfaces tilted with respect to the rotation axis.

A light scanning device according to another aspect of the invention includes: a rotary deflector configured to reflect and deflect an incident luminous flux by plural reflection surfaces arrayed in a rotating direction and thus cause the incident luminous flux to scan a predetermined direction, in which at least one of the plural reflection surfaces is tilted with respect to the rotation axis of the rotary deflector; and thrust-direction force canceling member supported in a rotatable manner integrally with the plural reflection surfaces of the rotary deflector, and for generating, by air resistance, a force in a direction opposite to a thrust-direction force generated by air resistance received by at least one surface of the reflection surfaces tilted with respect to the rotation axis.

An image forming apparatus according to still another aspect of the invention includes: a light scanning device having a configuration as described above; a photoconductor on which an electrostatic latent image is formed by a luminous flux cast for scanning by the light scanning device; and a developing unit configured to develop the electrostatic latent image formed on the photoconductor.

A thrust-direction force canceling method according to an aspect of the invention includes canceling at least a part of a first thrust-direction force generated by air resistance received by at least one surface of reflection surfaces arrayed in a rotating direction of a rotary deflector and tilted with respect to the rotation axis of the rotary deflector, by a second thrust-direction force generated by air resistance received by a surface tilted with respect to the rotation axis in a direction opposite to the surface where the first thrust-direction force is generated.

BRIEF DESCRIPTION OF THE DRAWINGS

FIG. 8 is a view showing an exemplary shape definition formula for a lens surface.

FIG. 9 is a table showing optical layout data in the light scanning device according to the first embodiment of the invention.

FIG. 10 is a table showing paraxial characteristic data in the light scanning device according to the first embodiment of the invention.

FIG. 11 is a table showing decentration and tilt data in the light scanning device according to the first embodiment of the invention.

FIG. 12 is a table showing coefficient data representing lens shape and so on in the light scanning device according to the first embodiment of the invention.

FIG. 16 is a table showing optical layout data in the light scanning device according to the second embodiment of the invention.

FIG. 17 is a table showing paraxial characteristic data in the light scanning device according to the second embodiment of the invention.

FIG. 18 is a table showing decentration and tilt data in the light scanning device according to the second embodiment of the invention.

FIG. 19 is a table showing coefficient data representing lens shape in the light scanning device according to the second embodiment of the invention.

FIG. 25 is a table showing optical layout data in the light scanning device according to the third embodiment of the invention.

FIG. 26 is a table showing paraxial characteristic data in the light scanning device according to the third embodiment of the invention.

FIG. 27 is a table showing decentration and tilt data in the light scanning device according to the third embodiment of the invention.

FIG. 28 is a table showing coefficient data representing lens shape in the light scanning device according to the third embodiment of the invention.

FIG. 29 is plan view of an optical path in a light scanning device according to the fourth embodiment of the invention.

FIG. 31 is a table showing optical layout data in the light scanning device according to the fourth embodiment of the invention.

FIG. 32 is a table showing paraxial characteristic data in the light scanning device according to the fourth embodiment of the invention.

FIG. 33 is a table showing decentration and tilt data in the light scanning device according to the fourth embodiment of the invention.

FIG. 34 is a table showing coefficient data representing lens shape in the light scanning device according to the fourth embodiment of the invention.

DESCRIPTION OF THE EMBODIMENTS

Hereinafter, embodiments of the invention will be described with reference to the drawings.

First Embodiment

First, the first embodiment of the invention will be described.

Figure 1:
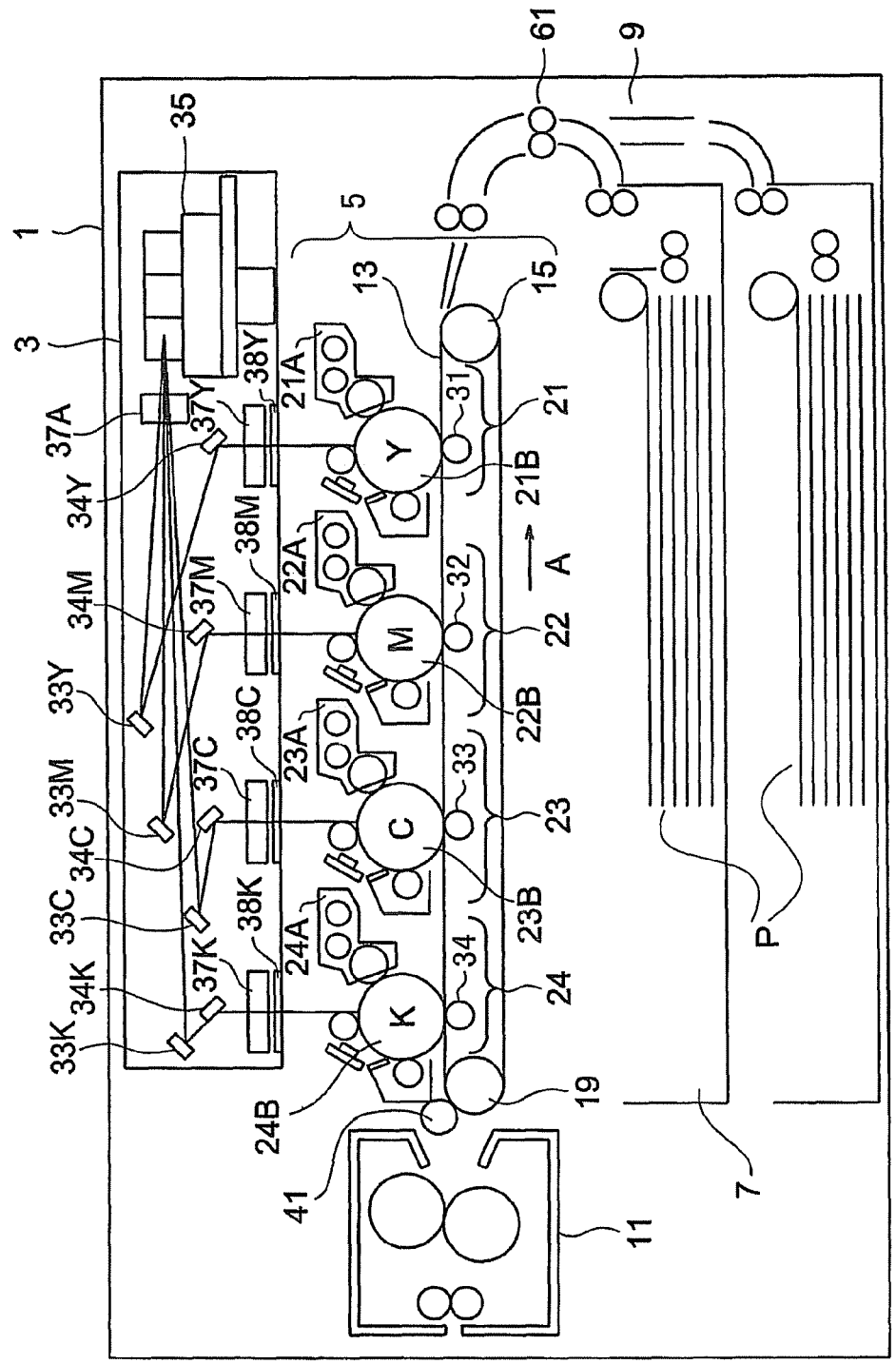
FIG. 1 is a view showing an exemplary configuration of an image forming apparatus having a light scanning device according to the first embodiment of the invention.

FIG. 1 is a view showing an exemplary configuration of an image forming apparatus having a light scanning device according to the embodiment of the invention. Here, an example is shown in which a color printer apparatus is used as the image forming apparatus according to this embodiment. However, the image forming apparatus is not limited to this. As a matter of course, a color copying apparatus, a facsimile apparatus and so on may also be used.

The image forming apparatus 1 according to this embodiment has a light scanning device 3 which generates scanning light corresponding to an image signal, and an image forming section 5 which makes visible an electrostatic latent image formed on a photoconductor by the scanning light from the light scanning device 3, by using toner, and transfers and outputs the formed toner image onto a paper P.

The paper P is held in a paper holding unit 7. The paper holding unit 7 can hold predetermined number of sheet-like papers P and supplies the papers P to the image forming section 5 according to the timing when a toner image is formed by the image forming section 5.

A carrying path 9 for carrying the papers P from the paper holding unit 7 toward the image forming section 5 is provided between the paper holding unit 7 and the image forming section 5. The carrying path 9 guides the papers P to a fixing device 11 which fixes the toner image transferred onto the paper P, to the paper P, via a transfer position where the toner image formed by the image forming section 5 is transferred to the paper P.

The image forming section 5 has a transfer belt 13 formed by, for example, shaping an insulating film with a predetermined thickness in the shape of an endless belt. The material of the transfer belt 13 is not limited to the insulating film. A thin metal sheet with its surface protected by resin or the like may also be used.

The transfer belt 13 is wound on a driving roller 15 and a following roller 19, and a predetermined tension is applied to the transfer belt 13 by these rollers. As the driving roller 15 is rotationally driven, an arbitrary position on the transfer belt 13 parallel to the axial line of the driving roller 15 is moved in the direction of an arrow A. In other words, the belt surface of the transfer belt 13 is circulated in one direction at a speed at which the outer circumferential surface of the driving roller 15 is moved.

In a section where the belt surface of the transfer belt 13 is moved substantially flatly in the state where the predetermined tension is applied, first, second, third and fourth image forming units 21, 22, 23 and 24 are arrayed at predetermined intervals.

The first image forming unit 21, the second image forming unit 22, the third image forming unit 23 and the fourth image forming unit 24 include developing devices 21A, 22A, 23A and 24A which house toner of colors Y (yellow), M (magenta), C (cyan) and K (black), and photoconductive drums 21B, 22B, 23B and 24B which hold an electrostatic image to be developed by each developing device.

On the surface (outer circumferential surface) of the photoconductive drum of each of the image forming units 21 to 24, an electrostatic latent image corresponding to an image of the color to be developed by the developing device set in the image forming unit is formed by the scanning light from the light scanning device 3. The electrostatic latent images thus formed on the photoconductors are developed with the toner supplied from the corresponding developing devices.

The first to fourth image forming units 21 to 24 are facing transfer rollers 31 to 34, with the transfer belt 13 provided between them. These transfer rollers 31 to 34 push the side of the transfer belt 13 which is not facing the photoconductors, to the photoconductive drums, and thus transfer the toner images on the photoconductive drums to the paper P held and carried on the transfer belt 13.

In the image forming apparatus 1 in which the developing devices 21A, 22A, 23A and 24A, photoconductive drums 21B, 22B, 23B and 24B, the transfer rollers 31, 32, 33 and 34 and the transfer belt 13 are arrayed as described above, image light generated as an image signal supplied by an image signal supply unit, not shown, is supplied to the light scanning device 3 for each color component, is exposed to the surface of the photoconductive drums integrated with the developing devices which hold toner of the corresponding colors.

At this time, in the individual image forming units 21 to 24, electrostatic latent images are formed on the photoconductive drums in predetermined timing in such a manner that toner images to be sequentially transferred are superimposed on each other on the paper P, and the electrostatic latent images are developed by the corresponding developing devices.

The toner images formed on the photoconductive drums 213, 22B, 23B and 24B of the individual image forming units 21 to 24 are transferred to the paper P on the transfer belt 13 by the transfer rollers 31 to 34 corresponding to the individual photoconductive drums 21B, 22B, 23B and 24B. At this time, as the transfer belt 13 is moved at a predetermined speed, the toner images of Y, M, C and K are sequentially stacked on the paper P on the transfer belt 13.

In this embodiment, an example where roller units are used as the transfer rollers 31 to 34 is described, as shown in FIG. 1. However, voltage generators such as Scorotron may also be employed as transfer means.

At a predetermined position in the carrying path 9, registration rollers 61 are provided which temporarily stop the paper P guided from the paper holding unit 7 to the transfer position. Of the registration rollers 61, at least one roller rotates in a predetermined direction and the other roller is pressed against the one roller by a predetermined pressure via a press-contact mechanism, not shown.

As the paper P guided through the carrying path 9 from the paper holding unit 7 toward the transfer position is butted against a nipping part of the registration rollers 61 in the stop state, its skew is corrected.

Figure 2:
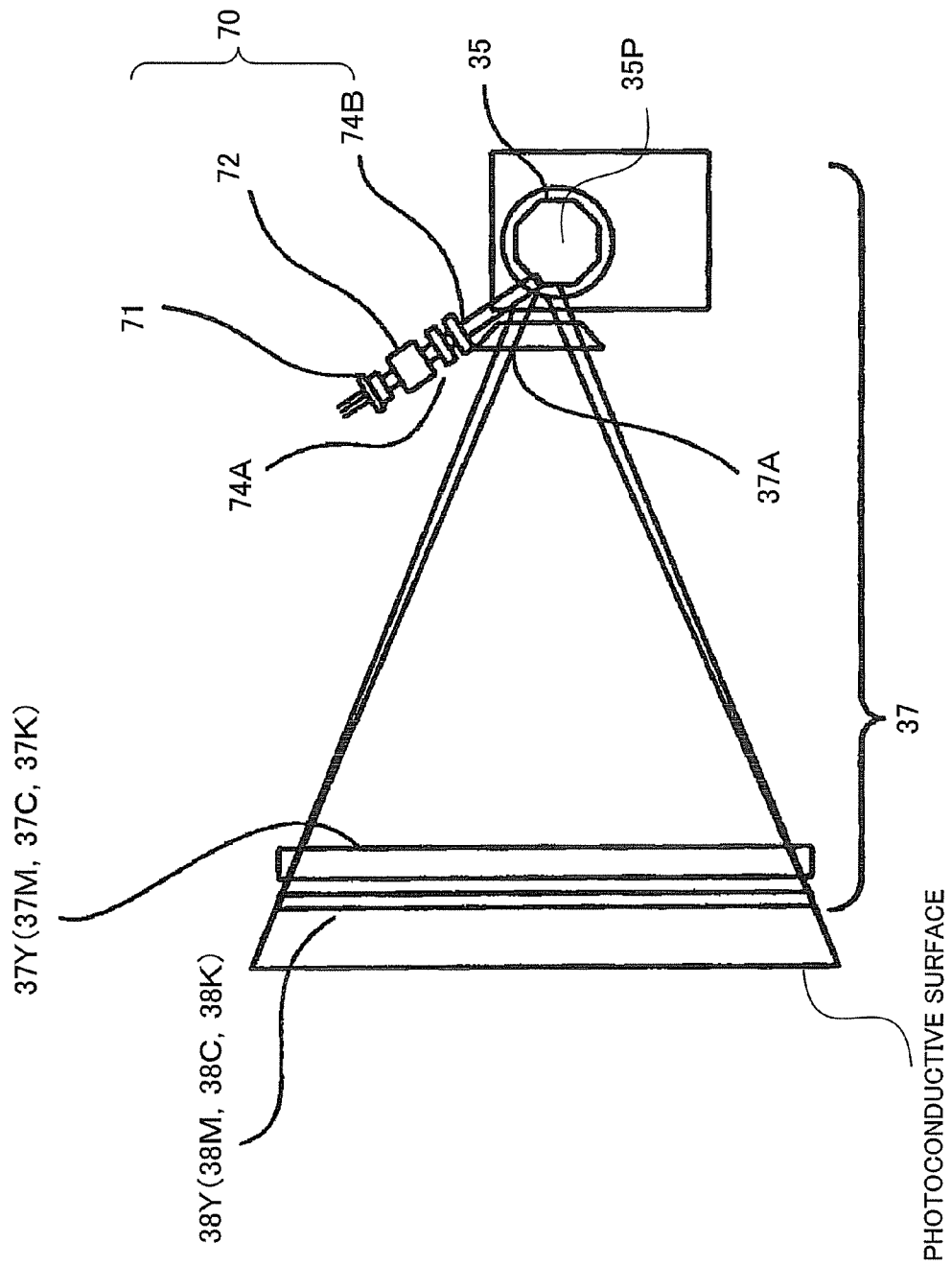
FIG. 2 is a plan view for explaining the details of the light scanning device 3 according to the embodiment.
Figure 3:
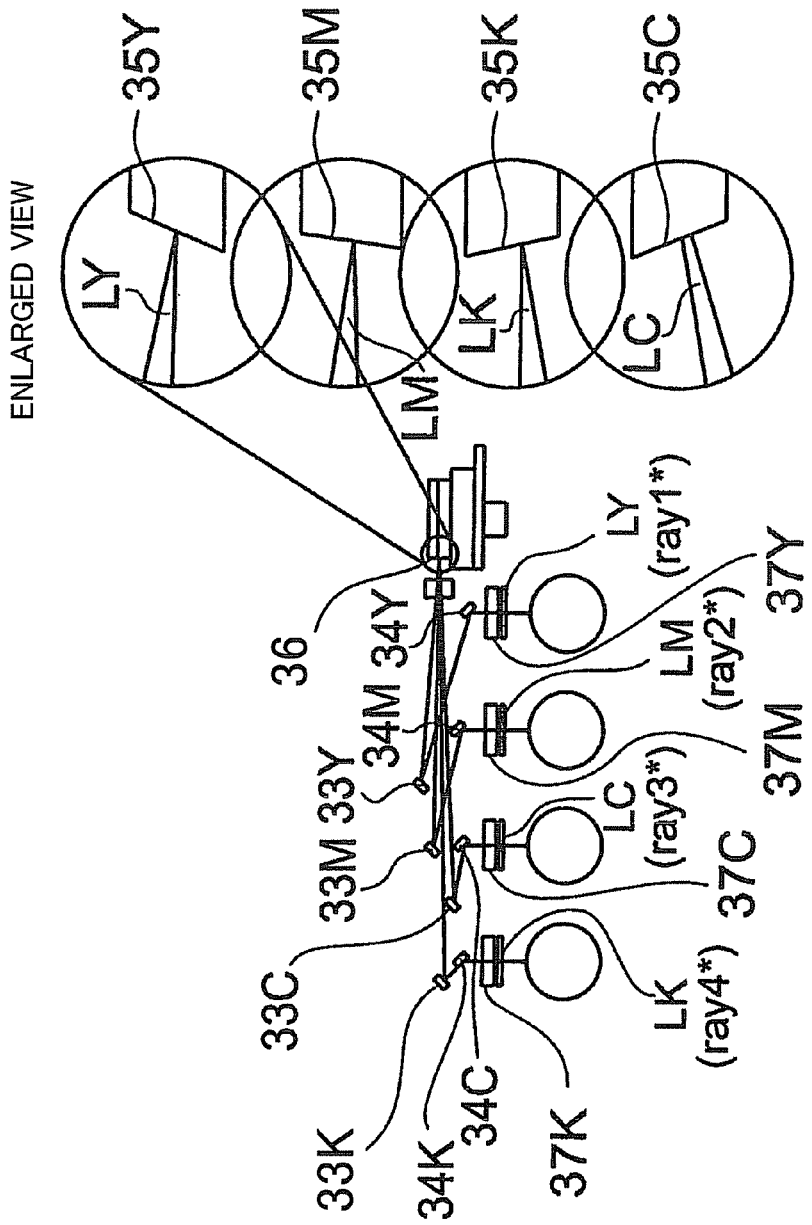
FIG. 3 is a side view for explaining the configuration of the periphery of the light scanning device 3 in the image forming apparatus 1 according to the embodiment.

FIG. 2 is a plan view for explaining the details of the light scanning device 3 in this embodiment. FIG. 3 is a side view for explaining the configuration of the periphery of the light scanning device 3 in the image forming apparatus 1 according to this embodiment.

The light scanning device 3 has the function of scanning the photoconductive surfaces of the plural photoconductive drums 21B, 22B, 23B and 24B in the main scanning direction with a luminous flux from a light source. Electrostatic latent images are formed on the photoconductive surfaces of the photoconductive drums 21B, 22B, 23B and 24B by the luminous flux cast for scanning by the light scanning device 3. The electrostatic latent images formed on the photoconductive drums are developed by the developing devices 21A, 22A, 23A and 24A with developers of the colors corresponding to the individual photoconductive drums.

A polygon mirror (rotary deflector) 35 reflects and deflects an incident luminous flux by plural reflection surfaces 35Y, 35M, 35C and 35K arrayed in the rotating direction of the polygon mirror 35, corresponding to the plural photoconductive drums, and thus causes the incident luminous flux to scan the main scanning direction (predetermined direction). Also, the tilt angle of the plural reflection surfaces 35Y, 35M, 35C and 35K of the polygon mirror 35 to the rotation axis $35p$ of the polygon mirror 35 is set at an angle corresponding to the photoconductor to which each reflection surface corresponds. Here, the reflection surfaces 35Y, 35M, 35C and 35K are supported in an integrally rotatable manner about the rotation axis $35p$ as the central axis of rotation. Here, the configuration in which all the reflection surfaces of the polygon mirror 35 are tilted with respect to the rotation axis $35p$ is described as an example. However, the configuration is not limited to this and the invention can be applied to any configuration in which at least one of these plural reflection surfaces is tilted with respect to the rotation axis $35p$.

A pre-deflection optical system 70 has an LD array 71 including four LDs which are arranged at different positions from each other in the sub scanning direction (direction of the rotation axis of the polygon mirror) orthogonal to the main scanning direction and can flash independently of each other, a finite lens (or collimating lens) 72 which converts divergent light from the LD array 71 into converged light, parallel light or moderate diffuse light, an aperture, not shown, and cylindrical lenses 74A and 743 which condense the luminous flux in the vicinity of the polygon mirror 35.

With this configuration, the pre-deflection optical system 70 shapes light from the LD array 71 into a luminous flux having a cross section which is long in the main scanning direction, then guides the luminous flux toward the polygon mirror 35, and condenses the luminous flux in the sub scanning direction in the vicinity of the reflection surface of the polygon mirror 35.

A post-deflection optical system 37 includes plural optical elements made of a resin material such as plastics. Specifically, the post-deflection optical system 37 has an fθ1 lens 37A having a free-form surface with such power distribution that power continuously changes, and fθ2 lenses 37Y, 37M, 37C and 37K and cover glasses 38Y, 38M, 38C and 38K provided corresponding to the individual photoconductive drums.

With this configuration, the post-deflection optical system guides luminous fluxes reflected and deflected respectively by the plural reflection surfaces 35Y to 35K of the polygon mirror 35, to the photoconductive surfaces of the photoconductive drums 213, 22B, 23B and 24B corresponding to the reflection surfaces through different optical paths from each other.

Specifically, the luminous fluxes reflected by the reflection surfaces 35Y, 35M, 35C and 35K are guided to first folding mirrors 33Y, 33M, 33C and 33K and are further folded by second folding mirrors 34Y, 34M, 34C and 34K to reach the corresponding photoconductive drums. The luminous fluxes, thus folded, pass through the fθ2 lenses 37Y, 37M, 37C and 37K, then pass through the cover glasses 38Y, 38M, 38C and 38K, and are guided to the photoconductive drums. In this case, it is important that the components should be arranged in such a manner that each luminous flux and the optical element of each folding mirror or the like should not interfere with each other.

Also, in this embodiment, since the polygon mirror 35 has eight reflection surfaces, if one luminous flux is made incident on the polygon mirror, color information of the four colors can be written for two lines on each photoconductor as the polygon mirror 35 rotates by a single turn. Here, a so-called "multi-beam optical system" is employed in which the LD array 71 emits four luminous fluxes. Therefore, color information of the four colors can be written for eight lines on each photoconductor as the polygon mirror 35 rotates by a single turn.

The fθ1 lens 37A and the fθ2 lenses 37Y, 37M, 37C and 37K have their curvatures changed independently in the two directions, that is, the main scanning direction and the sub scanning direction. The fθ1 lens 37A in this case is equivalent to a shared optical element. The power distribution of the fθ1 lens 37A and each of the fθ2 lenses 37Y, 37M, 37C and 37K is set in such a such manner that the luminous flux reflected and deflected by the polygon mirror 35 so as to be guided to each of the plural photoconductive drums 21B, 22B, 23B and 24B is provided with power which causes the luminous flux guided to the photoconductive surface by the post-deflection optical system 37 to have predetermined optical characteristics (for example, characteristics that satisfy predetermined conditions with respect to the beam diameter of the luminous flux, the degree of curving of the scanning line, the position of the luminous flux with respect to the scanning range, and so on) on the photoconductive surface according to the position of incidence of the luminous flux. In this manner, the shared optical element has a smooth lens surface which acts on all the luminous fluxes reflected and deflected by the plural reflection surfaces of the polygon mirror 35.

In this manner, as a part of the optical elements which are traditionally provided independently for each photoconductor is collectively used as a shared optical element and all the luminous fluxes to be guided to the plural photoconductors are provided with power by the shared optical element, it can contribute to reduction in the arrangement space of the optical components to be arranged in the sub scanning direction. Also, since the number of optical components to be arranged can be reduced, deterioration in optical characteristics due to an arrangement error of each optical component and so on can be avoided and it can also contribute to reduction in cost.

Moreover, as a part of the optical elements provided independently for each photoconductor is collectively used as a shared optical element, the tilt angle of each reflection surface of the polygon mirror can be set at a small angle and the arrangement space in the sub scanning direction of the optical system can be reduced. Also, occurrence of asymmetrical wavefront aberration which increases in the case where the reflection surfaces of the polygon mirror have a large tilt angle can be restrained, and therefore improvement in image forming characteristics can be realized. Moreover, as the light scanning device having such a configuration is applied to an image forming apparatus, it is possible to contribute to reduction in size of the image forming apparatus and stable image quality in image forming processing.

Here, "predetermined optical characteristics" refer to optical characteristics which are desirable in order to form electrostatic latent images on the photoconductive surfaces of the photoconductors. As the incident luminous flux from the pre-deflection optical system to the polygon mirror is condensed in the vicinity of the reflection surfaces (a conjugate relation is formed in the sub scanning direction between the reflection surfaces of the polygon mirror and the photoconductive surfaces of the photoconductors), a shift of beam position in the sub scanning direction due to the tilt of each reflection surface of the polygon mirror is restrained (correction of face tangle error).

The polygon mirror 35 is fixed on the bearing surface on a rotor fixed to the shaft of a polygon motor 36. This polygon motor 36 is rotationally driven at a predetermined speed (number of rotations) for deflection scanning. The number of the reflection surfaces provided on the polygon mirror 35 and the number of rotations are prescribed in accordance with an output request (that is, resolution, printing speed and the like required of the image forming apparatus 1).

Figure 4:
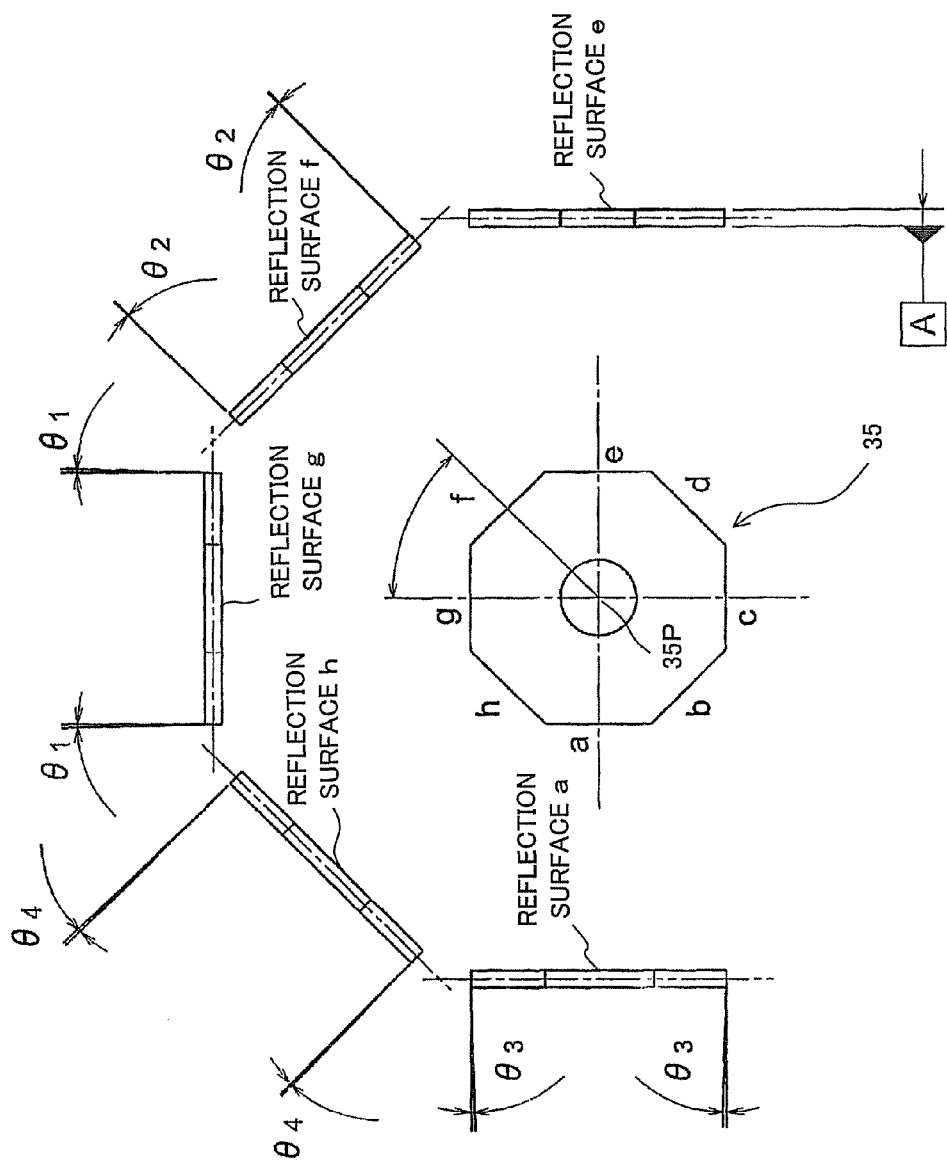
FIG. 4 is a view showing the planar shape of a polygon mirror according to the first embodiment of the invention and the shape of each reflection surface as viewed from a lateral side.

FIG. 4 is a view showing the planar shape of the polygon mirror according to the first embodiment of the invention and the shape of each reflection surface as viewed from a lateral side.

In FIG. 4, the side of a reference surface A represents the surface installed on a base part of the polygon motor 36. In FIG. 4, the surface a and the surface e of the polygon mirror 35 are set at a tilt angle $\theta_1$ with respect to the rotation axis of the polygon mirror 35. The surface d and the surface h are set at a tilt angle $\theta_2$. The surface c and the surface g are set at a tilt angle $\theta_3$. The surface b and the surface f are set at a tilt angle $\theta_4$.

Moreover, in this example, in terms of the absolute value of the tilt angle of a polygon mirror surface to the central axis of rotation 35p of the polygon motor (central axis of the polygon mirror), $\theta_1$ and $\theta_3$ are the largest and equal to each other with opposite signs. (That is, the relation of $\theta_1 = -\theta_3$ holds). Here, a value of tilt angle $\theta$ with a "−" (negative) sign means that the surface tilts in a direction of approaching the direction of the rotation axis (central axis of the polygon mirror) 35p as it moves away from the reference surface A.

That is, in this embodiment, in the polygon mirror including reflection surfaces having a tilt with respect to the rotation axis of the polygon mirror, the plural reflection surfaces include the surfaces a and e having the maximum tilt angle with respect to the rotation axis and the reflection surfaces c and g having the same absolute value of angle from the rotation axis as the reflection surface a and having the opposite tilt direction (a pair of surfaces having the maximum absolute value of tilt angle is set at a tilt angle $\pm\theta_1$). In this case, one of the reflection surfaces a and e and one of the reflection surfaces c and g serve as wind receiving surfaces to cancel or reduce a thrust-direction force generated by air resistance received by the other surfaces. Also, as the tilt angle of the pair of surfaces having the maximum absolute value of tilt angle is set at $\pm\theta_1$, occurrence of asymmetrical wavefront aberration which increases in the case where the reflection surfaces of the polygon mirror have a large tilt angle can be restrained, and hence improvement in image forming characteristics can be realized.

In this embodiment, as an example, the thrust-direction force generated by air resistance received by the reflection surface tilted toward one side with respect to the rotation axis of the polygon mirror is almost perfectly canceled by the thrust-direction force generated by air resistance received by the reflection surface tilted toward the other side with respect to the rotation axis. However, the way of canceling the thrust-direction force is not limited to this. For example, if it suffices to cancel only a thrust-direction force generated by a part of the plural reflection surfaces tilted toward one side with respect to the rotation axis of the polygon mirror (if slight deviation of the thrust-direction force can be tolerated), a reflection surface that can generate a thrust-direction force in the opposite direction capable of canceling the thrust-direction force generated by the part of the reflection surfaces (a wind receiving surface tilted in the opposite direction to the part of the reflection surfaces with respect to the rotation axis) can be provided. Here, the reflection surface which forms this wind receiving surface serves to reflect and deflect a luminous flux and also serves as a thrust-direction force canceling unit.

Also, a second thrust-direction force to cancel a first thrust-direction force generated by air resistance received by a certain reflection surface need not necessarily be generated by the same number of reflection surfaces as the former reflection surface(s), having the same absolute value of tilt angle. That is, it suffices to generate the second thrust-direction force that can cancel at least a part of the first thrust-direction force, as a result of air resistance received by a reflection surface which serves as a wind receiving surface. For example, the first thrust-direction force generated by a reflection surface having a certain tilt angle can be canceled or reduced by the second thrust-direction force generated by plural reflection surfaces tilted in the opposite direction to the former reflection surface and having a broader tilt angle than that reflection surface. In this manner, for example, the second thrust-direction force can be generated by a greater (or smaller) number of reflection surfaces than the number of reflection surfaces that generate the first thrust-direction force to be canceled or reduced.

In the case where only a part of the plural reflection surfaces of the polygon mirror is tilted in the opposite directions, it is preferable that the surfaces having the largest tilt angle with respect to the rotation axis should form a pair. Generally, the surfaces having the largest tilt angle with respect to the rotation axis generate the largest thrust-direction force when the polygon mirror rotates. Therefore, as the thrust-direction force is canceled or reduced, the absolute value of the thrust-direction force applied to the polygon mirror at the time of rotation can be reduced.

In this manner, in the light scanning device according to this embodiment, at least a part of the first thrust-direction force generated by air resistance received by at least one surface (for example, the reflection surface a) of the reflection surfaces arrayed in the rotating direction of the polygon mirror 35 and tilted with respect to the rotation axis 35p of the polygon mirror 35 is canceled by the second thrust-direction force generated by air resistance received by a surface (for example, the reflection surface c) tilted with respect to the rotation axis 35p in the opposite direction to the surface where the first thrust-direction force is generated (thrust-direction force canceling method).

As the polygon mirror of such a configuration is employed, shift of the polygon mirror in the axial direction can be restrained which is caused by the generation of a deviated thrust-direction force due to the influence of air resistance received by the reflection surfaces when the polygon mirror rotates. Even in the case where the polygon motor is rotated at several patterns of rotation speeds in order to deal with different printing speeds, change in the force applied in the axial direction can be restrained. Thus, the problem of variance in the position in the direction of rotation axis of the polygon mirror and hence change in optical characteristics can be avoided.

Meanwhile, in FIG. 4, as $\theta_2 = -\theta_4$ is set and the thrust-direction force generated by air resistance received by the reflection surfaces d and h is canceled by the thrust-direction force generated by air resistance received by the reflection surfaces b and f and the reflection surfaces d and h, a deviated thrust-direction force is prevented from being applied to the polygon mirror 35 and positional variance in the direction of rotation axis accompanied by the rotation of the polygon mirror can be restrained. That is, it is possible to stably hold the position in the direction of rotation axis of the polygon mirror without using any expensive or complicated supporting mechanism and irrespective of the rotating movement of the polygon mirror.

Also, with the configuration according to this embodiment, the optical characteristics of the light scanning device can be stabilized, and it is not necessary to take a large effective reflection area of the reflection surfaces in the direction of rotation axis of the polygon mirror in anticipation of change in the position of the polygon mirror in the axial direction. The thickness of the polygon mirror in the direction of rotation axis can be reduced. Therefore, windage loss when the polygon mirror rotates can be restrained and increase in motor load and noise can be restrained.

Also, at the time of starting or stopping the rotation, change in the force applied in the axial direction can be restrained. Therefore, it is not necessary to increase rigidity of the supporting mechanism by providing a bearing to support the force in the axial direction or by using a magnetic force. This can contribute to reduction in the cost of the apparatus.

Also, in this embodiment, the reflection surface a and the reflection surface e having the angle $\theta_1$ which has the maximum difference in angle to the rotation axis, and the reflection surface c and the reflection surface g having the angle $\theta_3$ are not arranged next to each other. When the polygon mirror rotates, the flow of wind in the axial direction is prevented from largely changing, and thus windage loss and noise are prevented. That is, the plural reflection surfaces a to h are arrayed in such combinations that the difference in the tilt angle with respect to the rotation axis 35p between the neighboring reflection surfaces is smaller than the maximum difference in angle ($\theta_1 - \theta_3$) that can be generated by a combination of the plural reflection surfaces a to h.

The polygon mirror 35 as described above is arranged on the polygon motor 36 including a DC brushless motor or the like and is fixed, with a leaf spring, wave washer or the like, onto the bearing surface integrally formed with the rotor of the DC brushless motor.

Figure 5:
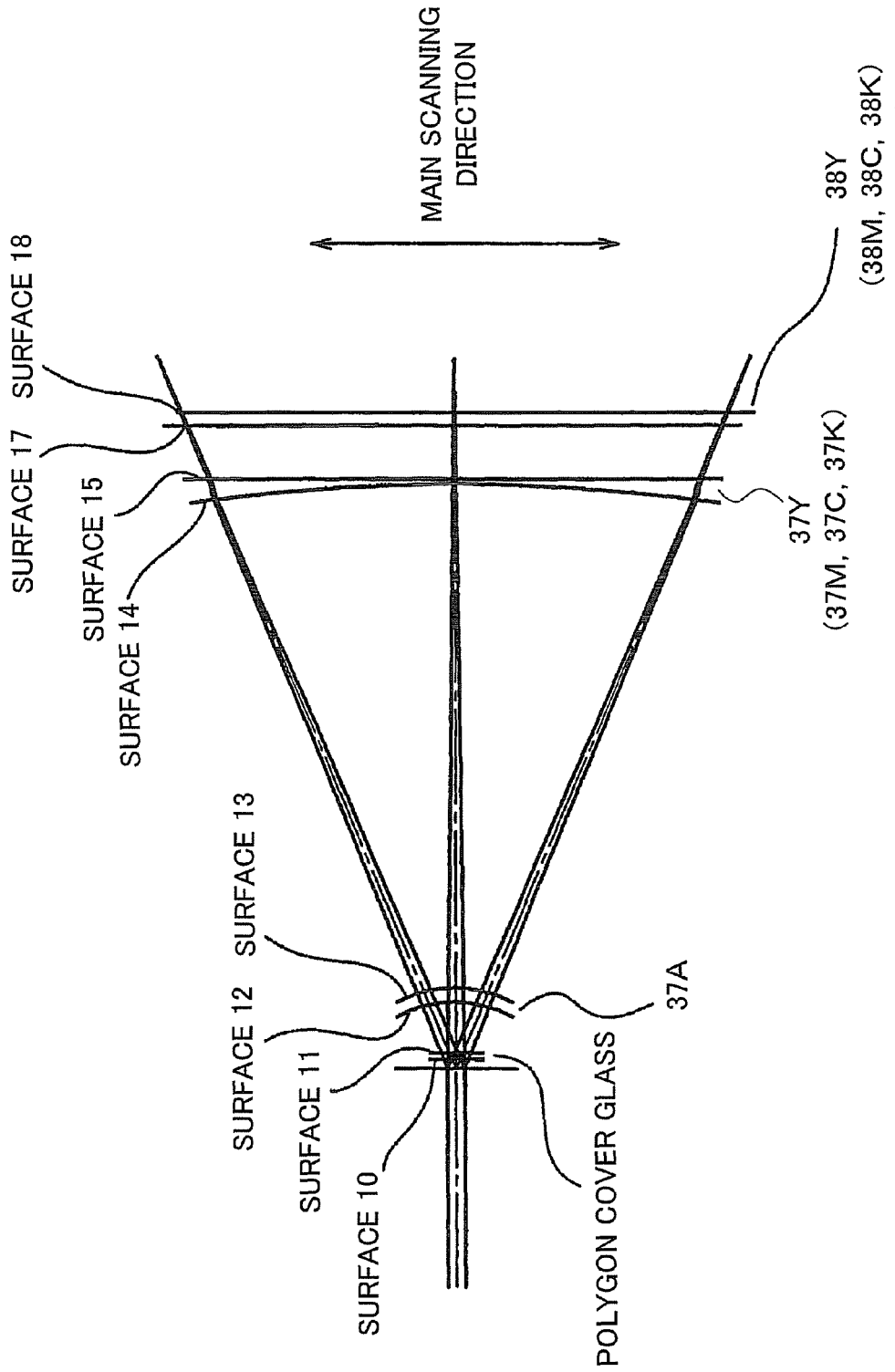
FIG. 5 is a plan view showing an optical path in the light scanning device according to the first embodiment of the invention.
Figure 6:
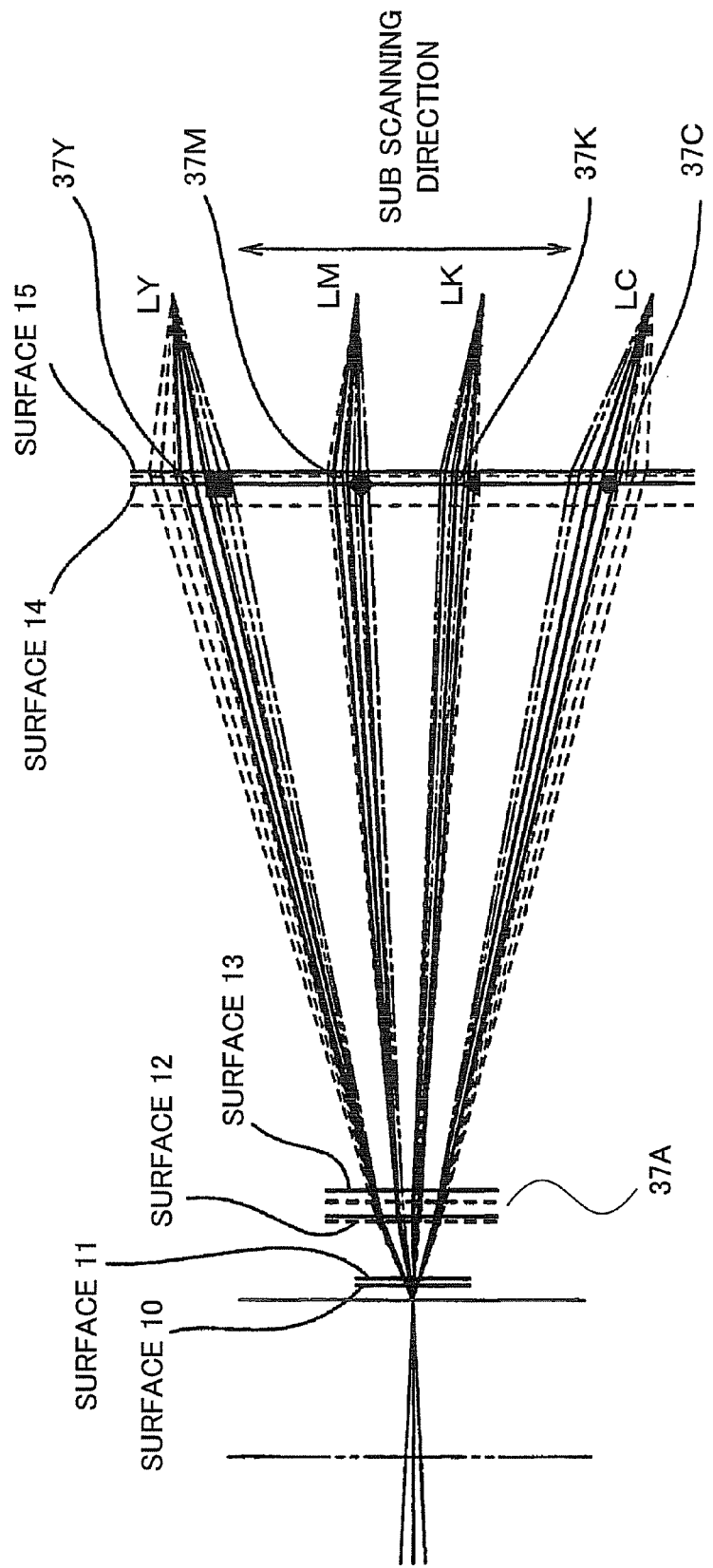
FIG. 6 is a longitudinal sectional view of the optical path in the light scanning device according to the first embodiment of the invention, as enlarged in the sub scanning direction.
Figure 7:
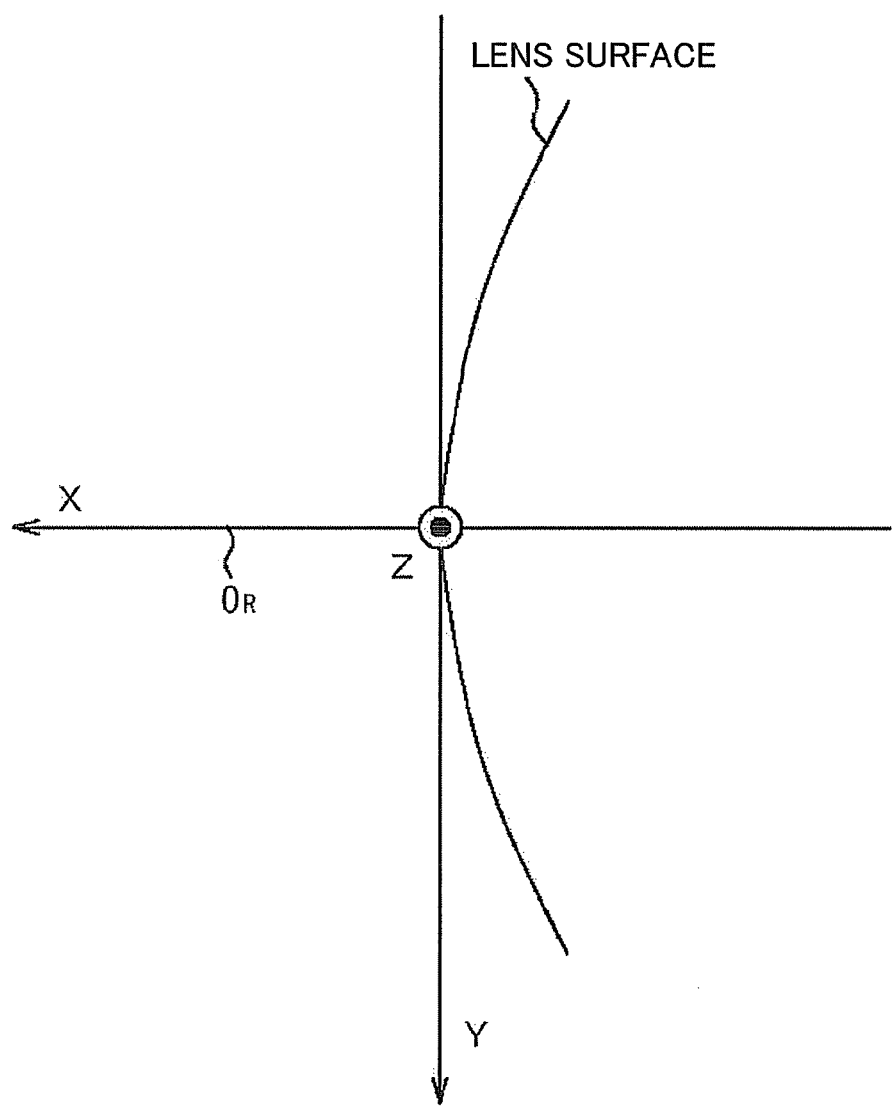
FIG. 7 is a view showing an exemplary coordinate system at the time of defining the shape of a lens surface.

FIG. 5 is a plan view showing an optical path in the light scanning device according to the first embodiment of the invention. FIG. 6 is a longitudinal sectional view showing the optical path in the light scanning device according to the first embodiment of the invention, as enlarged in the sub scanning direction. FIG. 7 is a view showing an exemplary coordinate system for defining the shape of a lens surface. FIG. 8 is a view showing an exemplary shape defining formula for the lens surface. FIG. 9 is a table showing optical layout data in the light scanning device according to the first embodiment of the invention. FIG. 10 is a table showing paraxial characteristic data in the light scanning device according to the first embodiment of the invention. FIG. 11 is a table showing decentration and tilt data in the light scanning device according to the first embodiment of the invention. FIG. 12 is a table showing coefficient data representing the lens shape and so on in the light scanning device according to the first embodiment of the invention.

FIG. 9 to FIG. 12 show properties and specifications of the light scanning device according to this embodiment.

In FIG. 9, REFRACTIVE INDEX AFTER REFLECTION, DISTANCE BETWEEN SURFACES AND SHAPE DATA HAVE NEGATIVE SIGN (−) ADDED THERETO; LENS SURFACE SHAPE WITH CURVED SURFACE POLYNOMIAL COEFFICIENT DATA IS EXPRESSED BY THE FOLLOWING EQUATION: $X=(cuy^*y^2+cuz^*z^2)/(1+Sqrt(1-ay^*cuy^{2*}y^2-az^*cuz^{2*}z^2))=\Sigma a_{lm}{}^*y^l{}^*z^m$; IN THIS EXAMPLE, ay=1, az=1; y DIRECTION: MAIN SCANNING DIRECTION, z DIRECTION: SUB SCANNING DIRECTION, x DIRECTION: DIRECTION OF OPTICAL AXIS (+ SIDE IN EACH LOCAL COORDINATE SYSTEM OF PRE-DEFLECTION OPTICAL SYSTEM AND − SIDE IN EACH LOCAL COORDINATE SYSTEM OF POST-DEFLECTION OPTICAL SYSTEM.

The shape of the lens surface of each optical element in the light scanning device according to this embodiment is expressed, for example, by a shape defining formula as shown in FIG. 8 in the case where the shape of the lens surface is expressed according to a coordinate system as shown in FIG. 7. In this embodiment, ay=1 and az=1 hold in the defining formula shown in FIG. 8. $O_R$ in FIG. 7 represents the optical axis.

FIG. 9 shows that the diameter of the inscribed circle of the polygon mirror 35 is 40.0 mm in this embodiment. FIG. 9 also shows that when the main scanning direction is expressed as Y-direction, the sub scanning direction as Z-direction and the direction of the optical axis as X-direction (+ before deflection and − after deflection), the position of the center of rotation of the polygon mirror 35 is at a position that is 17.5 mm in the X-direction (the direction in which light on the optical axis of the pre-deflection optical system travels) and 9.8 mm in the Y-direction (the direction perpendicular to the direction in which the light on the optical axis of the pre-deflection optical system travels and to the direction of the rotation axis of the polygon mirror), as expressed in the local coordinate system of the reflection surface of the polygon mirror 35.

FIG. 9 also shows the tilt angles $\theta_1$ to $\theta_4$ from the center of rotation of the polygon mirror. It can be seen from FIG. 9 that the tilt angles of the reflection surfaces of the polygon mirror are set at $\pm\theta_1$ and $\pm\theta_2$. Moreover, the distance to the image forming position of a finite focus lens 72 is set at 814.3 mm from the position of the photoconductor-side principal point of the finite lens.

FIG. 9 also shows the curvature and spacing (TH) on the optical axis on each surface (incident surface and exit surface) of each optical element, the refractive index of each optical element and so on. In FIG. 9, the distance (TH) between optical elements that are next to each other is described as being common to laser beams LY (described as RAY1 in FIG. 9), LM (described as RAY2 in FIG. 9), LC (described as RAY4 in FIG. 9) and LK (described as RAY3 in FIG. 9), and also described as being different among the laser beams LY (RAY1), LM (RAY2), LC (RAY4) and LK (RAY3).

FIG. 10 is a view showing the paraxial power of the fθ1 lens 37A and the fθ2 lenses 37Y, 37M, 37C and 37K in the first embodiment.

FIG. 11 is a view showing decentration and tilt angle in the local coordinate system of each optical element. Each optical element in this embodiment is arranged with the decentration and tilt shown in FIG. 11. Here, "Surface No" used in FIG. 5, FIG. 6, FIG. 9 and FIG. 11 is common to these drawings.

The "Surface No" in FIG. 5, FIG. 6, FIG. 9 and FIG. 11 represents the order according to which the light emitted from the LD array 71 passes through the surface of each optical element. Here, the surface No1 represents the position of the image-side principal point of the finite lens 72. The surface No2 represents the incident surface (toward the LD array 71) of the cylindrical lens 74A.

In the column corresponding to the surface No1 in FIG. 9, the distance TN is 33.3 and the refractive index N is 1. This means that light exiting from the position of the photoconductor-side principal point of the finite lens 72 is propagated 33.3 mm through a medium having a refractive index of 1 (through air) and reaches the surface of the surface No2.

It can be understood from the column corresponding to the surface No2 shown in FIG. 9 that the surface of the surface No2 has a curvature 0.02078 in the sub scanning direction, that the propagation distance to the surface of the surface No3 is 5.0 mm, and that this medium has a refractive index of 1.511 (that is, this medium is made of glass). Specifically, the surface No2 represents the incident surface side of the cylindrical lens 74A. The cylindrical lens 74A is made of glass and has a thickness of 5.0 mm, and its exit surface is formed by a plane surface with no curvature.

As the luminous flux exiting from the surface of the surface No3 is propagated 62.7 mm through air, the luminous flux becomes incident on the incident surface of the cylindrical lens 74B (surface No4). As the luminous flux incident on the cylindrical lens 74B is propagated through the glass having a thickness of 5.0 mm and a refractive index of 1.511, the luminous flux reaches the exit surface having a curvature of 0.08957 in the sub scanning direction (surface No5). As the luminous flux exiting from the surface of the surface No5 is propagated 24.0 mm through air with a refractive index of 1, the luminous flux reaches the incident surface of the polygon cover glass, not shown (surface No6). It can be seen from FIG. 9 that this polygon cover glass is made of glass with a refractive index of 1.511 and a thickness of 1.9 mm.

As the luminous flux passed through the polygon cover glass is propagated 20 mm, the luminous flux reaches the reflection surface of the polygon mirror 35, which is a deflection surface.

Next, the propagation via the surface of the surface No9 and the subsequent surfaces will be described with reference to FIG. 5, FIG. 6, FIG. 9 and FIG. 12.

As the luminous fluxes reflected and deflected by the reflection surfaces 35Y, 35M, 35C and 35K of the polygon mirror 35, which are deflection surfaces, are propagated 6.8 mm through air, the luminous fluxes reach the polygon cover glass made of glass with a thickness of 1.9 mm. The surface No10 represents the incident surface of the polygon cover glass. The surface No11 represents its exit surface. As the luminous fluxes passed through the polygon cover glass are propagated 25.1 mm through air, the luminous fluxes reach the fθ1 lens 37A. The surface No12 represents the incident surface of the fθ1 lens 37A. The surface No13 represents the exit surface of the fθ1 lens 37A. As shown in FIG. 9, it can be understood that this fθ1 lens 37A is made of plastics with a refractive index of 1.503 and with thickness of 9.8 mm. Here, the lens surface shape coefficient of the incident surface of the fθ1 lens 37A is shown in the coefficient table 1 of FIG. 12. The lens surface shape coefficient of the exit surface of the fθ1 lens 37A is shown in the coefficient table 2 of FIG. 12.

The luminous fluxes guided as described above are propagated through air by a distance (275.5 mm, 275.4 mm, 275.1 mm and 274.6 mm) corresponding to each photoconductive drum (21B, 22B, 23B and 24B), and then reach the fθ2 lenses 37Y, 37M, 37C and 37K. The surface No14 represents the incident surface of the fθ2 lenses. The surface No15 represents the exit surface of the fθ2 lenses. It can be understood from FIG. 9 that the fθ2 lenses are made of plastics with a refractive index of 1.503 and with a thickness of 4.5 mm.

Here, the lens surface shape coefficient of the incident surface of the fθ2 lenses is shown in the coefficient table 3 of FIG. 12. The lens surface shape coefficient of the exit surface of the fθ2 lenses 37Y, 37M, 37C and 37K is shown in the coefficient table 4 of FIG. 12.

Then, as the luminous fluxes which have been passed through the fθ2 lenses are propagated 27.2 mm through air, the luminous fluxes reach the cover glasses (38Y, 38M, 38C and 38K) having a thickness of 1.9 mm. The incident surface of the cover glasses is represented by the surface No17. Its exit surface is represented by the surface No18.

Then, the luminous fluxes which have been passed through the cover glasses are propagated by a predetermined distance through air (38 mm for RAY1, 38 mm for RAY2, 38.3 mm for RAY3 and 38.6 mm for RAY4), and reach the surface of each photoconductive drum.

FIG. 6 shows a longitudinal sectional view of the light scanning device according to the first embodiment of the invention, as enlarged in the sub scanning direction. More specifically, in the state where the cover glasses toward the photoconductive surfaces of the photoconductors (image surface) are eliminated and the folding of the optical path by the folding mirrors is carried out, the optical path at the center of the tilting angle is indicated by a solid line, and rays with maximum and minimum tilting angles are indicated by a dotted line and a double-chain-dotted line. In FIG. 6, the geometric figure of the lens on the side of the photoconductive surface represents the position of the optical axis of the lens on the side of the photoconductive surface. The bold double-chain-dotted line on the left side indicates the focal position toward the object point side in the sub scanning direction of the fθ lens 37A. In the post-deflection optical system, all the rays pass through the single fθ1 lens 37A, and the rays corresponding to the tilt angles on the individual polygon mirror reflection surfaces ($\theta_3$ for the laser beam LY (RAY1), $\theta_2$ for the laser beam LM (RAY2), $\theta_1$ for the laser beam LC (RAY4), and $\theta_4$ for the laser beam LK (RAY3)) pass through the fθ2 lenses 37Y, 37M, 37C and 37K.

As can be seen from FIG. 6, the spacing between the rays situated at both ends in the sub scanning direction (vertical direction) (rays LY and LC corresponding to $\theta_1$ and $\theta_3$, which have the maximum absolute value of tilt angle from the central axis of rotation of the polygon mirror) and the rays next to them is greater than the spacing between the inner rays (rays LM and LK corresponding to $\theta_2$ and $\theta_4$, which do not have the maximum absolute value of tilt angle from the central axis of rotation of the polygon mirror).

Since the distance between rays becomes greater toward the downstream of the rays, the rays having a large spacing from the next beam (rays LY and LC corresponding to $\theta_1$ and $\theta_3$, which have the maximum absolute value of tilt angle from the central axis of rotation of the polygon mirror) can be separated from the other rays on the upstream side of the rays.

Figure 20:
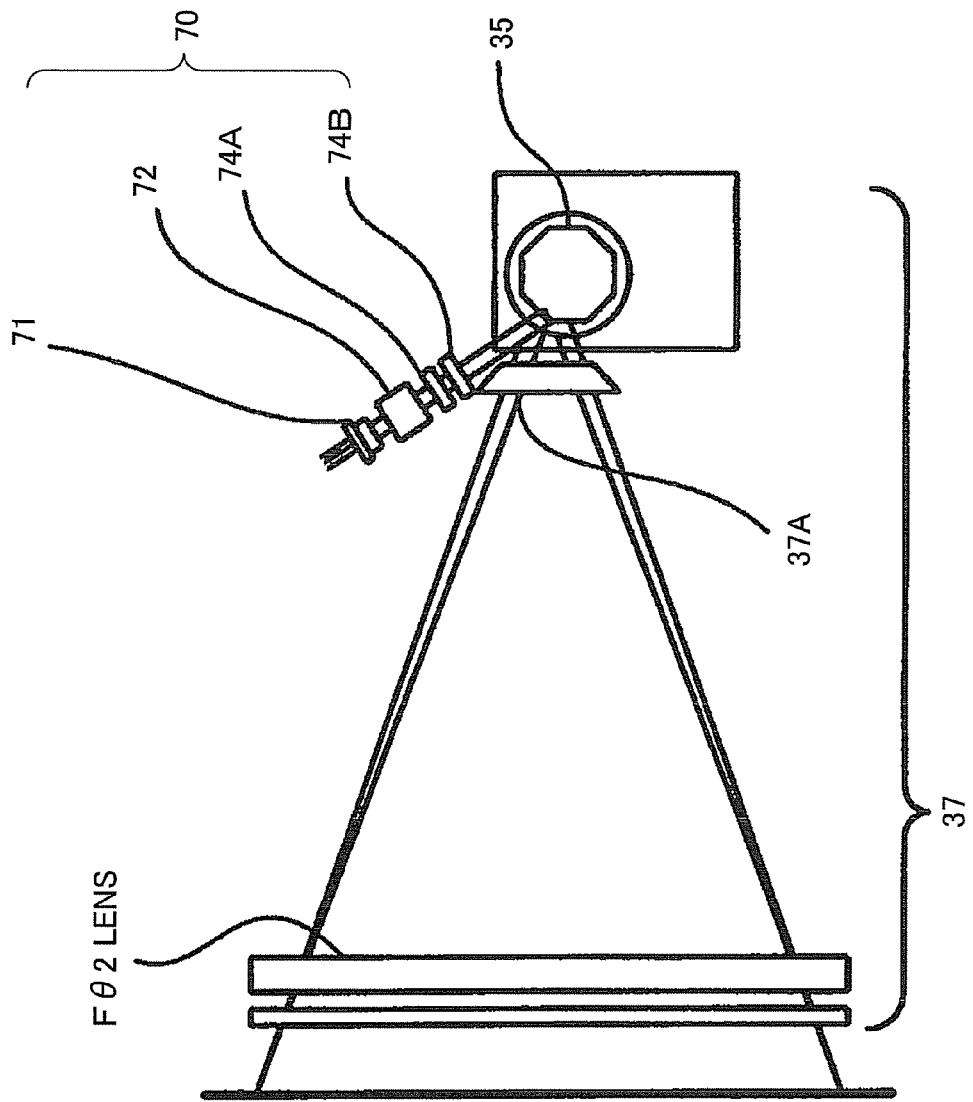
FIG. 20 is plan view of the optical path of a ray cast for scanning by the light scanning device according to the second embodiment of the invention, as viewed from above.

Also, in FIG. 3, the ray LC and the ray LY are the rays situated at both ends in the sub scanning direction. The ray LY is separated from the other rays at the most upstream part. The ray LC is separated from the other rays at the third most upstream part. In this way, as shown in FIG. 20, which will be described later, the second folding mirror 34C for the ray LC, and the ray LK passing through the outermost side can be prevented from interfering with each other, with respect to the case where one of the rays situated at both ends in the sub scanning direction is the ray LK.

Therefore, as the scanning optical system providing four scanning lines employs such a configuration that the position where the rays situated at both ends in the sub scanning direction are separated in the post-deflection optical system is the most upstream part (polygon mirror side) of the optical path and the third most upstream part, the mounting space can be reduced. Moreover, it is not necessary to carry out chamfering processing to the folding mirror in order to avoid interference between the ray and the folding mirror.

Figure 13:
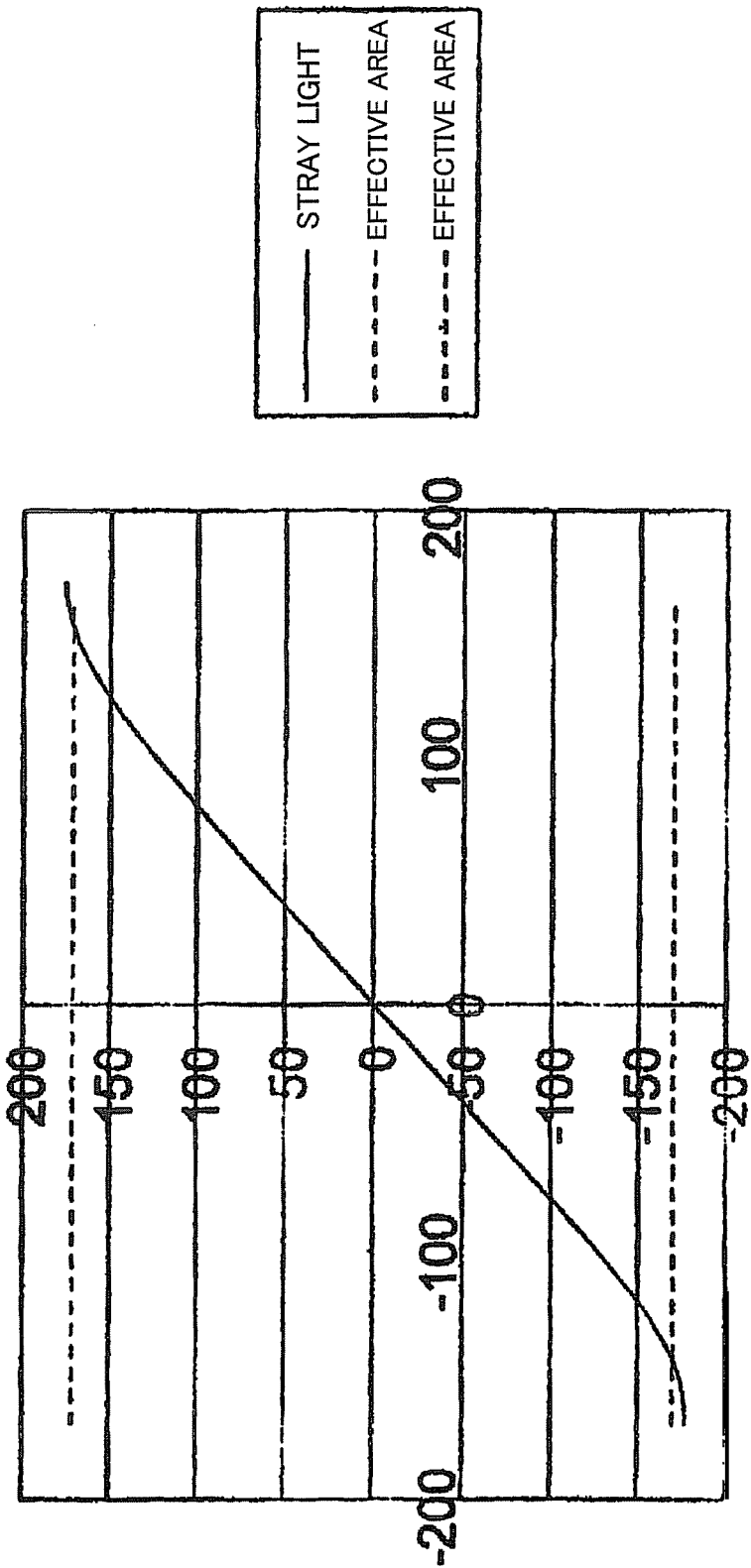
FIG. 13 is a graph showing the relation between stray light and position in the main scanning direction of a ray in the light scanning device according to the first embodiment of the invention.

FIG. 13 is a graph showing the relation between stray light and the position of a ray in the main scanning direction in the light scanning device according to the first embodiment of the invention.

FIG. 13 shows a graph in which the main scanning direction of a writing ray is plotted on the horizontal axis, and in which the position in the main scanning direction when stray light reflected on the exit surface of the fθ2 lens is reflected again on the incident surface of the fθ2 lens and reaches the photoconductive surface, is plotted on the vertical axis. The dotted line indicates the boundary of an effective area.

It can be seen from FIG. 13 that: (1) in the effective area, the stray light monotonously increases as the position of the writing ray shifts to the + (positive) side; and (2) its maximum and minimum values are outside of the effective area.

It can be seen from the above description (1) that the position of the stray light moves along with the movement of the writing light. It can be understood that the configuration according to this embodiment is effective for preventing accumulation of energy and its appearance on the image which would be caused by the immobile stray light when the writing ray is moving, since the stray light generated within the lens that is closest to the photoconductive surface is generally difficult to interrupt by a light shielding member.

Also, it can be seen from the above description (2) that the stray light is situated on the outer side in the effective area than the writing ray. Moreover, it can be understood that when the writing light has reached both ends of the effective area on the photoconductive drum, the stray light is situated outside of the effective area in the main scanning direction.

Second Embodiment

Next, the second embodiment of the invention will be described. This embodiment is a modification of the first embodiment. Hereinafter, in this embodiment, the units and elements having the similar functions as those described in the first embodiment are denoted by the same reference numerals and will not be described further in detail.

In the second embodiment, compared to the first embodiment 1, while $\theta_1 = -\theta_3$ holds for the surfaces having the largest absolute value of tilt angle in the polygon mirror 35 with respect to the rotation axis, $\theta_2 \neq -\theta_4$ is given. The lens system in the light scanning device according to this embodiment has a configuration equivalent to the configuration of the first embodiment.

Figure 14:
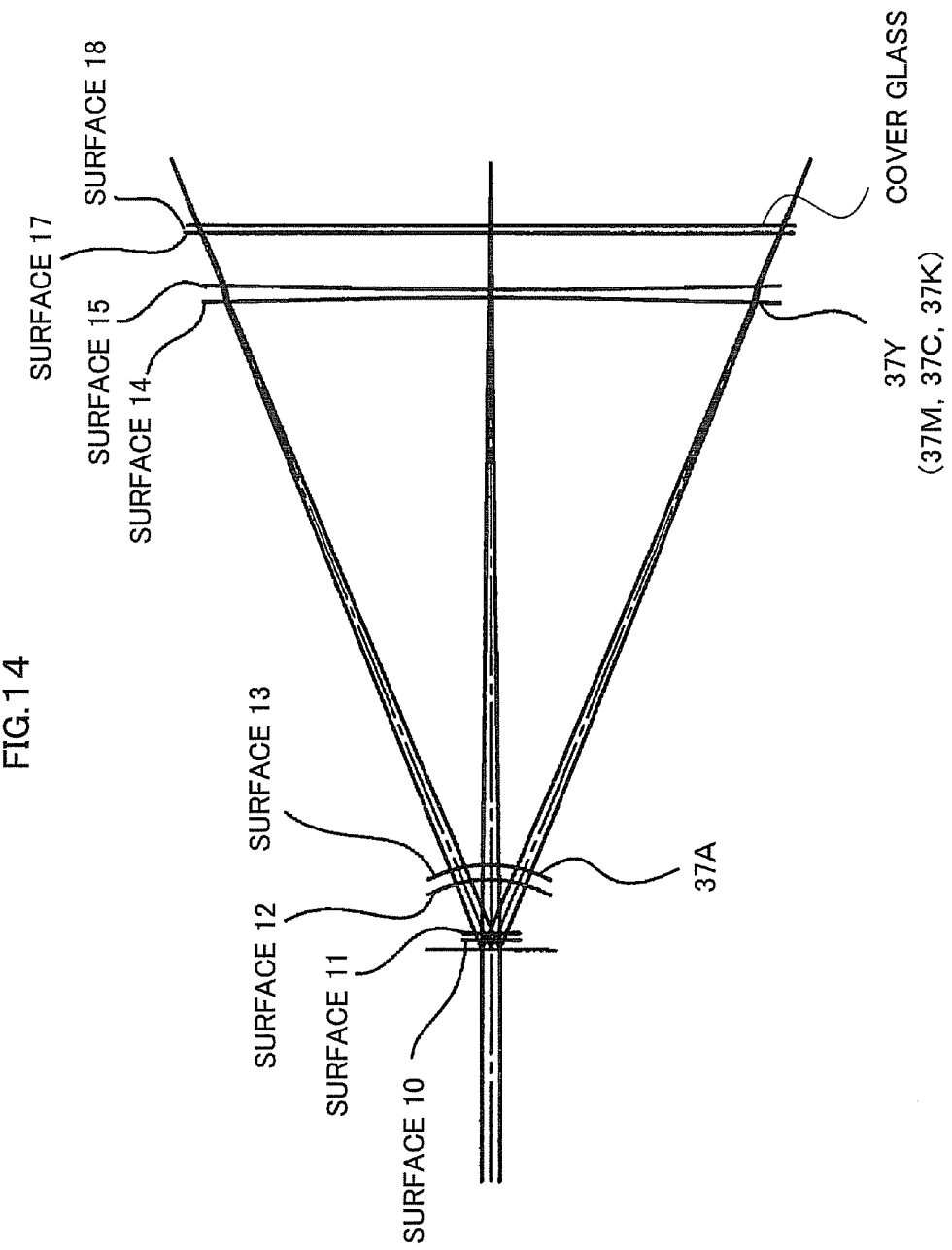
FIG. 14 is a plan view showing an optical path in a light scanning device according to the second embodiment of the invention.
Figure 15:
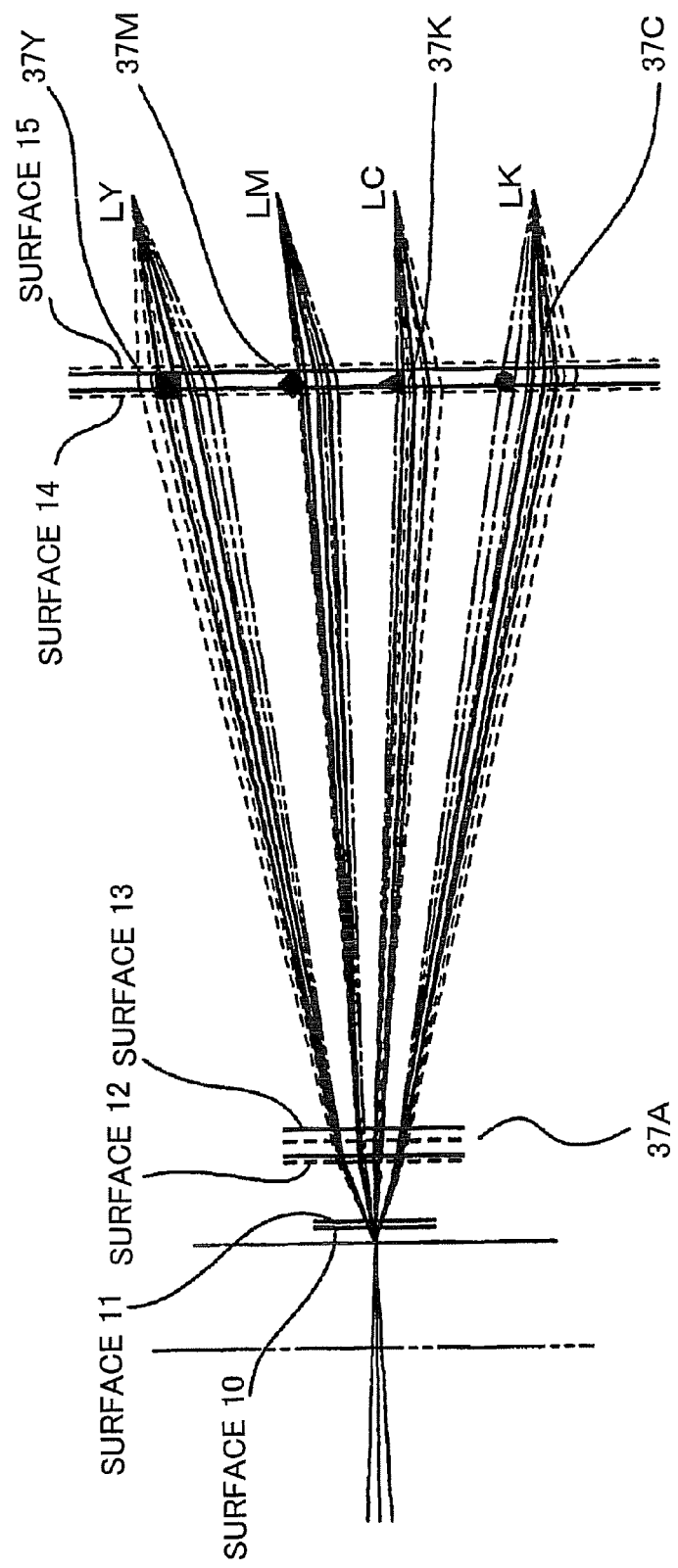
FIG. 15 is a longitudinal sectional view of the optical path in the light scanning device according to the second embodiment of the invention, as enlarged in the sub scanning direction.

FIG. 14 is a plan view showing an optical path in a light scanning device according to the second embodiment of the invention. FIG. 15 is a longitudinal sectional view showing the optical path in the light scanning device according to the second embodiment of the invention, as enlarged in the sub scanning direction. FIG. 16 is a table showing optical layout data in the light scanning device according to the second embodiment of the invention. FIG. 17 is a table showing paraxial characteristic data in the light scanning device according to the second embodiment of the invention. FIG. 18 is a table showing decentration and tilt data in the light scanning device according to the second embodiment of the invention. FIG. 19 is a table showing coefficient data representing the lens shape in the light scanning device according to the second embodiment of the invention.

Here, FIG. 16 corresponds to FIG. 9 in the first embodiment. FIG. 17 corresponds to FIG. 10 in the first embodiment. FIG. 18 corresponds to FIG. 11 in the first embodiment. FIG. 19 corresponds to FIG. 12 in the first embodiment. Moreover, FIG. 14 corresponds to FIG. 5 in the first embodiment. FIG. 15 corresponds to FIG. 6 in the first embodiment.

In FIG. 16, REFRACTIVE INDEX AFTER REFLECTION, DISTANCE BETWEEN SURFACES AND SHAPE DATA HAVE NEGATIVE SIGN (−) ADDED THERETO; LENS SURFACE SHAPE WITH CURVED SURFACE POLYNOMIAL COEFFICIENT DATA IS EXPRESSED BY THE FOLLOWING EQUATION: $X = (cuy*y^2 + cuz*z^2)/(1 + Sqrt(1 - ay*cuy^2*y^2 - az*cuz^2*z^2)) = \Sigma a_{lm}*y^l*z^m$; IN THIS EXAMPLE, ay=1, az=1; y DIRECTION: MAIN SCANNING DIRECTION, z DIRECTION: SUB SCANNING DIRECTION, x DIRECTION: DIRECTION OF OPTICAL AXIS (+ SIDE IN EACH LOCAL COORDINATE SYSTEM OF PRE-DEFLECTION OPTICAL SYSTEM AND − SIDE IN EACH LOCAL COORDINATE SYSTEM OF POST-DEFLECTION OPTICAL SYSTEM.

In FIG. 15, the optical path at the center of the tilting angle is indicated by a solid line, and rays with maximum and minimum tilting angles are indicated by a dotted line and a double-chain-dotted line. The geometric figure of the lens on the side of the photoconductive surface represents the position of the optical axis in FIG. 15. The bold double-chain-dotted line on the left side indicates the focal position toward the object point side in the sub scanning direction of the fθ1 lens 37A.

As can be seen from FIG. 15, the spacing between the rays next to each other is greater for the rays closer to the top side in FIG. 15.

Figure 21:
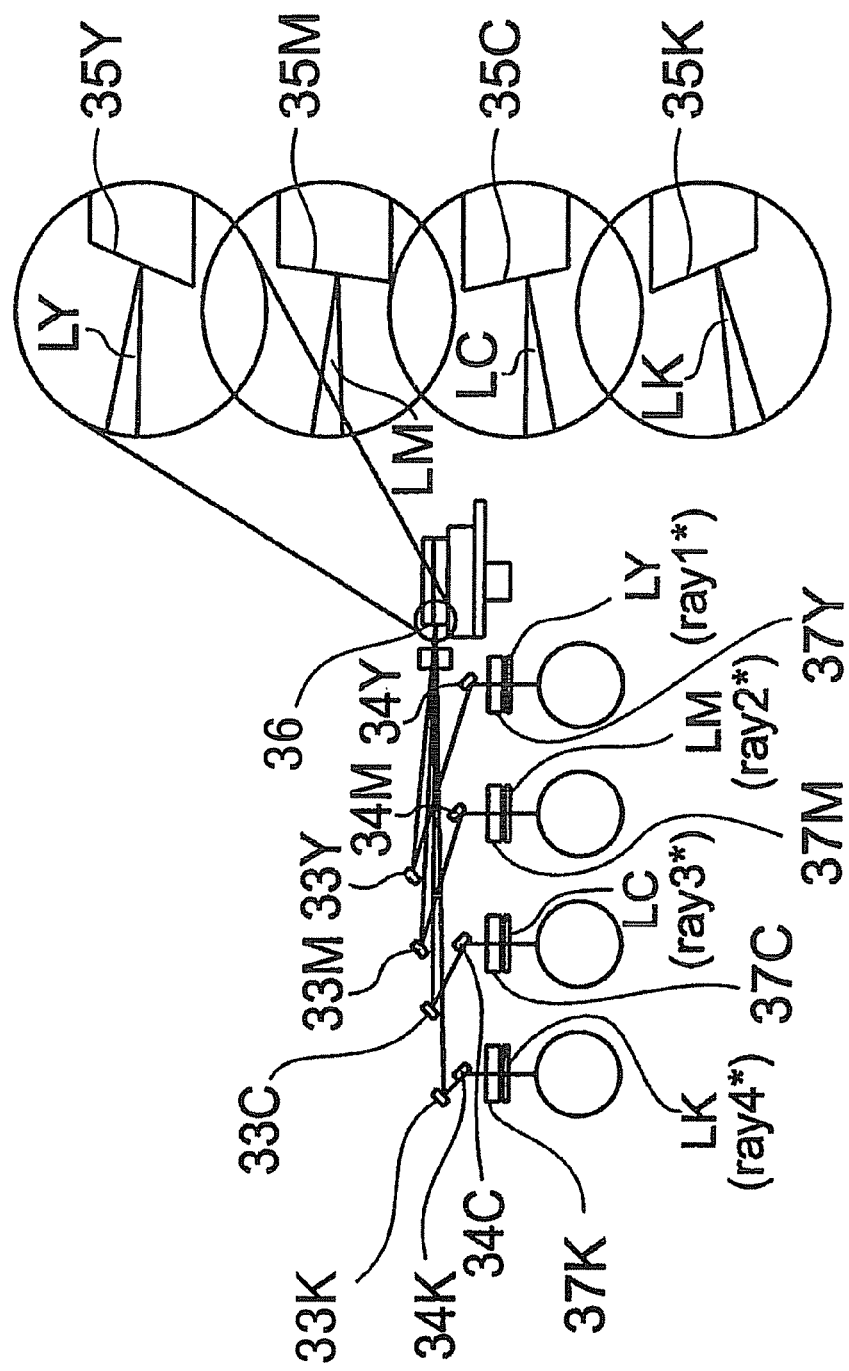
FIG. 21 is a side view of the optical path of a ray cast for scanning in an image forming apparatus having the light scanning device according to the second embodiment of the invention, as viewed from a lateral side.

FIG. 20 is a plan view of the optical path of a ray cast for scanning by the light scanning device according to the second embodiment of the invention, as viewed from above. FIG. 21 is a side view of the optical path of the ray cast for scanning in an image forming apparatus having the light scanning device according to the second embodiment of the invention, as viewed from a lateral side.

FIG. 21 shows a configuration in which rays are guided to four photoconductive drums by using folding mirrors. In this embodiment, the rays from the top side in FIG. 21 are separated in order on the upstream side. That is, the rays reflected and deflected by the polygon mirror 35 are separated in order of the ray LY, the ray LM, the ray LC and the ray LK and reach the first folding mirrors 33Y, 33M, 33C and 33K. Then, the rays LY, LM, LC and LK reach the second folding mirrors 34Y, 34M, 34C and 34K, pass through the fθ2 lenses 37Y, 37M, 37C and 37K corresponding to the individual photoconductive drums, pass through the cover glasses 38Y, 38M, 38C and 38K, and are then guided to the photoconductive drums.

In this configuration, the side of the second folding mirror for the ray LC that is closer to the ray LK is chamfered in order to prevent interference between the second folding mirror for the ray LC and the ray LK passing the outermost side.

Figure 22:
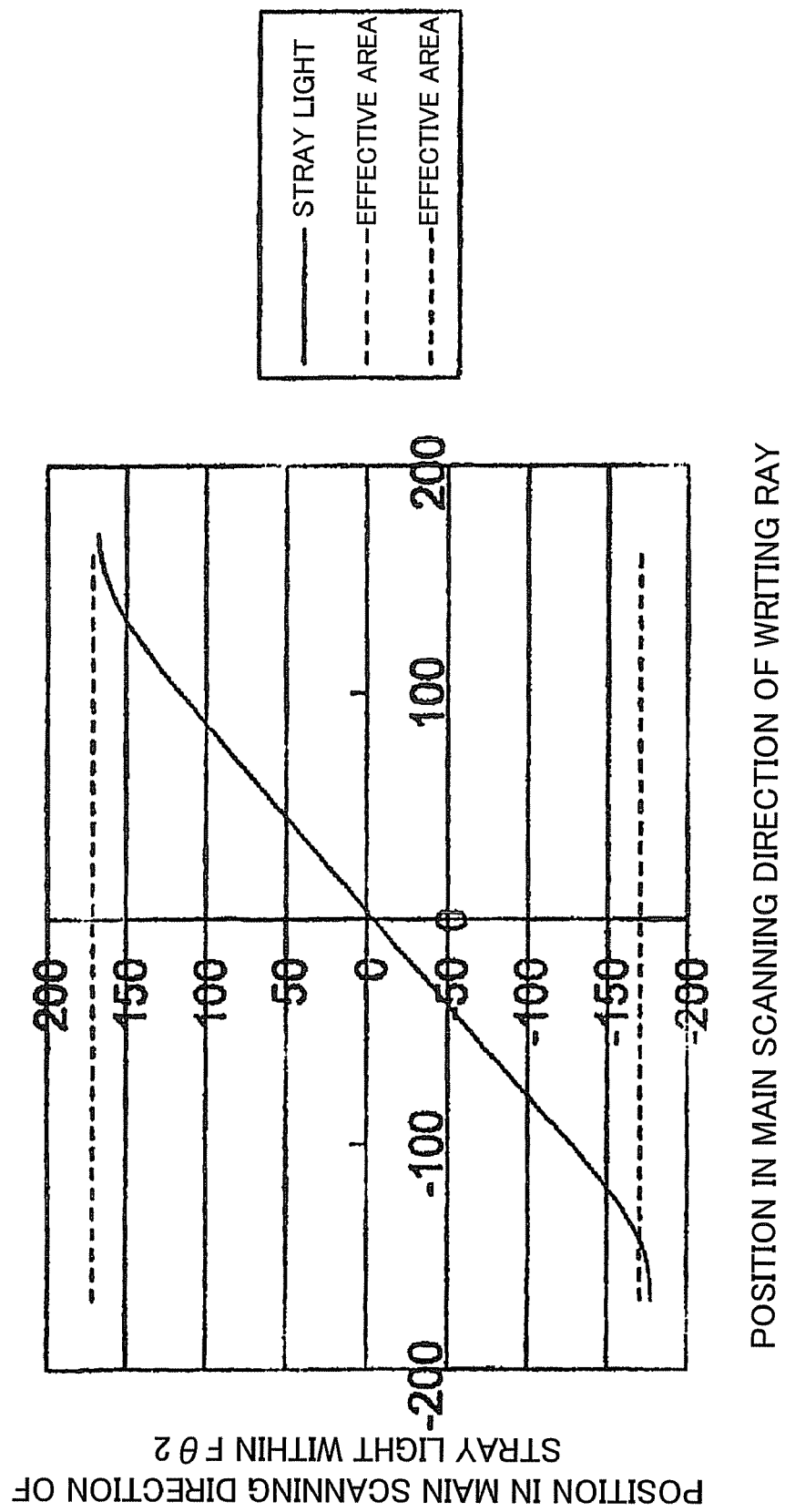
FIG. 22 is a graph showing the relation between stray light and position in the main scanning direction of a scanning ray in the light scanning device according to the second embodiment of the invention.

FIG. 22 is a graph showing the relation between stray light and the position of the scanning light in the main scanning direction in the light scanning device according to the second embodiment of the invention.

FIG. 22 shows a graph in which the main scanning direction of a writing ray is plotted on the horizontal axis, and the position in the main scanning direction when stray light reflected on the exit surface of the fθ2 lens is reflected again on the incident surface of the fθ2 lens and reaches the image surface, is plotted on the vertical axis. The dotted line indicates the boundary of an effective area.

Similarly to FIG. 13 shown in the first embodiment, it can be seen from FIG. 22 that: (1) in the effective area, the stray light monotonously increases as the position of the writing ray shifts toward the + (positive) side; and (2) its maximum and minimum values are outside of the effective area.

It can be seen from the above description (1) that the position of the stray light moves along with the movement of the writing light. It can be understood that the configuration of this embodiment is effective for preventing accumulation of energy and its appearance on the image which would be caused by the immobile stray light when the writing ray is moving, since the stray light generated within the lens that is closest to the photoconductive surface is generally difficult to interrupt by a light shielding member.

Also, it can be seen from the above description (2) that the stray light is situated on the outer side in the effective area than the writing ray. Moreover, it can be understood that that when the writing light has reached both ends of the effective area on the photoconductive drum, the stray light is situated outside of the effective area in the main scanning direction.

To realize the above functions in the light scanning device according to this embodiment, the lens that is closest to the photoconductive side has such a shape that its thickness increases toward the edge in the main scanning direction.

Third Embodiment

Next, the third embodiment of the invention will be described. This embodiment is a modification of the above first embodiment. Hereinafter, in this embodiment, the units and elements having the similar functions as those described in the first embodiment are denoted by the same reference numerals and will not be described further in detail.

In the third embodiment, the polygon mirror 35 and the scanning optical system which have the similar configuration as in the first embodiment are used, and a diffraction element surface is appended to the exit side of the four fθ2 lenses 37Y, 37M, 37C and 37K, thus optimizing optical characteristics.

Figure 23:
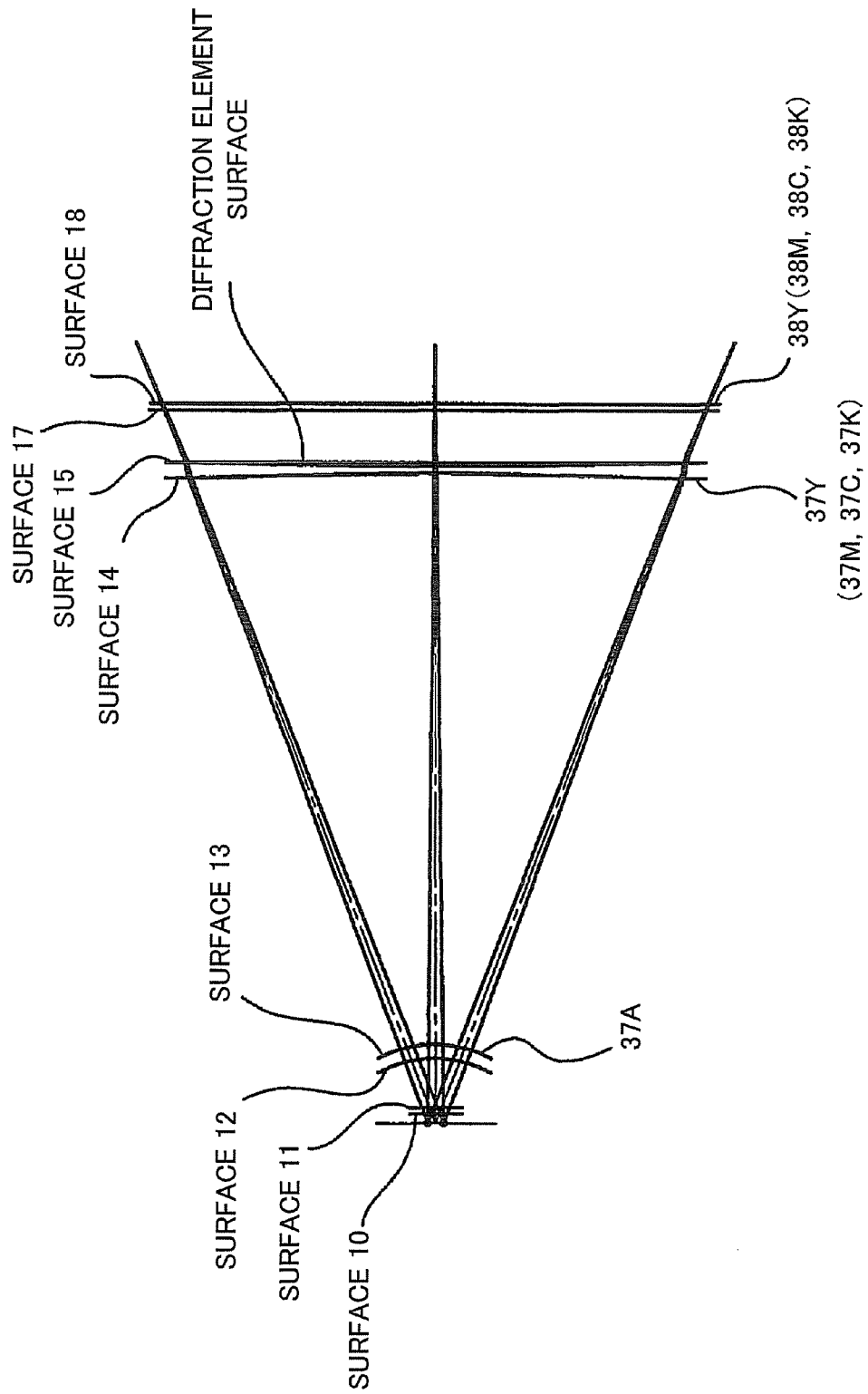
FIG. 23 is a plan view showing an optical path in a light scanning device according to the third embodiment of the invention.
Figure 24:
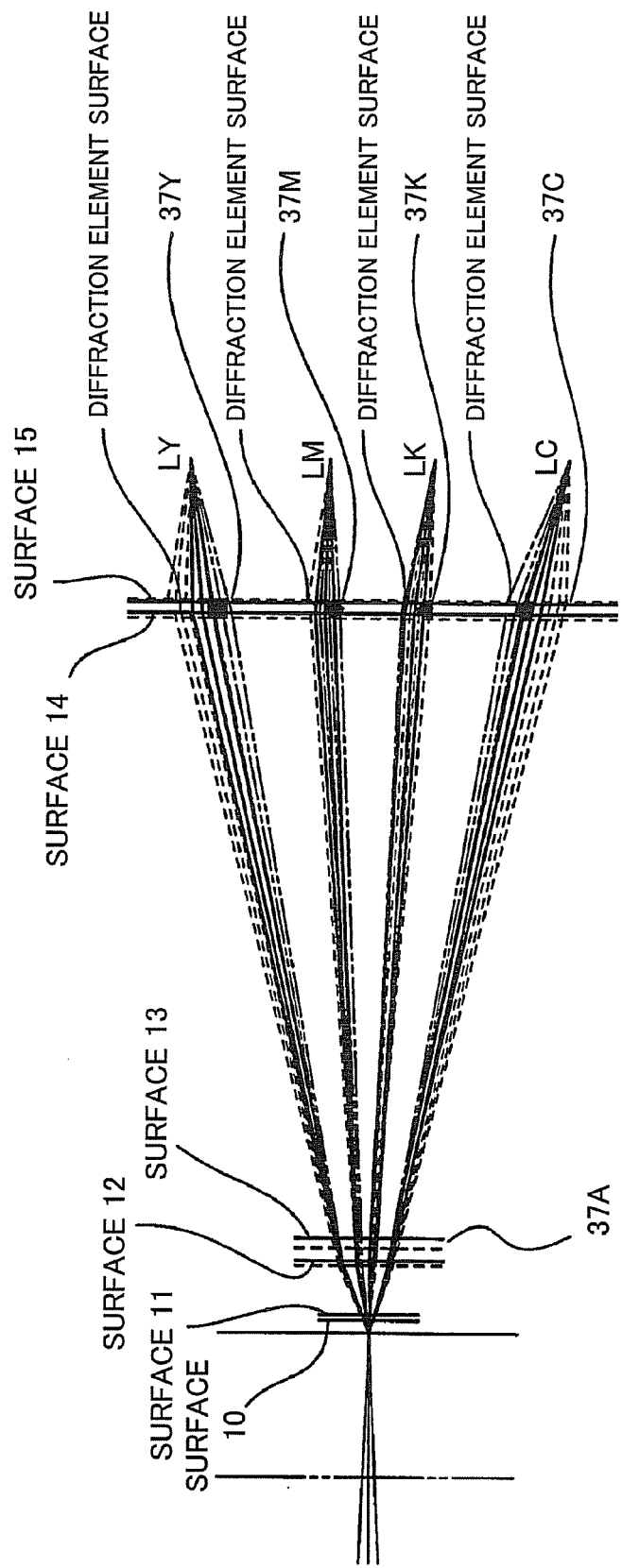
FIG. 24 is a longitudinal sectional view of the optical path in the light scanning device according to the third embodiment of the invention, as enlarged in the sub scanning direction.

FIG. 23 is a plan view showing an optical path in a light scanning device according to the third embodiment of the invention. FIG. 24 is a longitudinal sectional view showing the optical path in the light scanning device according to the third embodiment of the invention, as enlarged in the sub scanning direction. FIG. 25 is a table showing optical layout data in the light scanning device according to the third embodiment of the invention. FIG. 26 is a table showing paraxial characteristic data in the light scanning device according to the third embodiment of the invention. FIG. 27 is a table showing decentration and tilt data in the light scanning device according to the third embodiment of the invention. FIG. 28 is a table showing coefficient data representing the lens shape in the light scanning device according to the third embodiment of the invention.

Here, FIG. 25 corresponds to FIG. 9 in the first embodiment. FIG. 26 corresponds to FIG. 10 in the first embodiment. FIG. 27 corresponds to FIG. 11 in the first embodiment. FIG.

28 corresponds to FIG. 12 in the first embodiment. Moreover, FIG. 23 corresponds to FIG. 5 in the first embodiment. FIG. 24 corresponds to FIG. 6 in the first embodiment.

In FIG. 25, REFRACTIVE INDEX AFTER REFLECTION, DISTANCE BETWEEN SURFACES AND SHAPE DATA HAVE NEGATIVE SIGN (−) ADDED THERETO; LENS SURFACE SHAPE WITH CURVED SURFACE POLYNOMIAL COEFFICIENT DATA IS EXPRESSED BY THE FOLLOWING EQUATION: $X=(cuy*y^2+cuz*z^2)/(1+Sqrt(1-ay*cuy^2*y^2-az*cuz^2*z^2))=\Sigma a_{lm}*y^l*z^m$; IN THIS EXAMPLE, ay=1, az=1; y DIRECTION: MAIN SCANNING DIRECTION, z DIRECTION: SUB SCANNING DIRECTION, x DIRECTION: DIRECTION OF OPTICAL AXIS (+ SIDE IN EACH LOCAL COORDINATE SYSTEM OF PRE-DEFLECTION OPTICAL SYSTEM AND − SIDE IN EACH LOCAL COORDINATE SYSTEM OF POST-DEFLECTION OPTICAL SYSTEM.

The configuration shown in FIG. 23 is substantially the same as the configuration shown in FIG. 5 in the first embodiment. However, the third embodiment is different from the first embodiment in that a diffraction element surface is provided on the exit side of the fθ2 lenses 37Y, 37M, 37C and 37K.

As the diffraction element surface is provided as described above, the optical coefficient of these fθ2 lenses 37Y, 37M, 37C and 37K changes. The various optical coefficients and characteristics in the light scanning device as a whole according to the third embodiment take values as shown in FIG. 26 to FIG. 28.

As can be seen from FIG. 24, the spacing between the rays situated at both ends in the sub scanning direction (vertical direction) (rays corresponding to $\theta_1$ and $\theta_3$, which have the maximum absolute value of tilt angle from the central axis of rotation of the polygon mirror) and the rays next to them is greater than the spacing between the rays corresponding to $\theta_2$ and $\theta_4$, which do not have the maximum absolute value of tilt angle from the central axis of rotation of the polygon mirror. This feature is similar to the first embodiment.

Also, since the distance between rays becomes greater toward the downstream in the traveling direction of the rays, the rays corresponding to $\theta_1$ and $\theta_3$, which have the maximum absolute value of tilt angle from the central axis of rotation of the polygon mirror, can be separated from the other rays on the upstream side of the rays.

Therefore, even in the case where the diffraction element surface is provided on the exit surfaces of the fθ2 lenses 37Y, 37M, 37C and 37K, the rays can be guided to the photoconductive drums through the optical path similar to the optical path shown in FIG. 2 and FIG. 3 in the first embodiment.

That is, the rays LC and LY are rays situated at both ends in the sub scanning direction. The ray LY is separated from the other rays at the most upstream position and the ray LC is separated from the other rays at the third most upstream position. In this way, the second folding mirror 34C for the ray LC, and the ray LK passing through the outermost side in the sub scanning direction can be prevented from interfering with each other, compared to the configuration as shown in FIG. 21 in which the ray LK is set as a ray at one end.

Thus, even in the configuration in which the diffraction element surface is provided on the exit surfaces of the fθ2 lenses, as in this embodiment, as the configuration is employed in which, in the scanning optical system providing four scanning lines, the position where the rays at both ends in the sub scanning direction are separated in the post-deflection optical system is the most upstream part (polygon mirror side) of the optical path and the third most upstream part, the mounting space can be reduced. Moreover, it is not necessary to carry out chamfering processing to the folding mirror in order to avoid interference between the rays and the folding mirror.

The function of optical path difference of the diffraction grating surface is expressed by $\Sigma C_{LM} \times Y^L \times z^M$.

The fθ2 lenses in this case are plastic lenses on which individual luminous fluxes reflected and deflected by the polygon mirror 35 become incident at different incident positions from each other in the sub scanning direction orthogonal to the main scanning direction, of the plural optical elements forming the post-deflection optical system (irrespective of whether an individual optical element is used for each luminous flux or a common optical element is used for all the luminous fluxes). It suffices that the luminous fluxes incident on the fθ2 lenses are incident at different incident positions from each other in the sub scanning direction. One of the plural luminous fluxes may become incident through the optical axis of the post-deflection optical system. In this way, as the diffraction grating is formed on the optical elements on which the luminous fluxes from the respective lights sources become incident at different positions from each other in the sub scanning direction, relative space adjustment and angle adjustment between the luminous fluxes can be made according to temperature change.

The optical element on which the diffraction grating should be formed may be an optical element on which a luminous flux from the light source becomes incident at a different incident position from the optical path of the optical axis of the post-deflection optical system in the sub scanning direction orthogonal to the main scanning direction, of the plural optical elements forming the post-deflection optical system. Basically, the function of curving the optical path cannot be provided for a luminous flux which becomes incident through the optical axis. Therefore, in order to correct chromatic aberration according to temperature change by the diffraction grating, it is desired that the luminous flux should be made incident at a position that is at least different from the optical axis.

Also, the diffraction grating formed on the exit surface of the fθ2 lens has power in the sub scanning direction. Thus, occurrence of "longitudinal chromatic aberration" and "traverse chromatic aberration" can be restrained. Here, "traverse chromatic aberration" is equivalent to "chromatic aberration of magnification". "Longitudinal chromatic aberration" is equivalent to chromatic aberration which occurs in the direction of optical axis (that is, the focal point or the position of the image point on the axis varies according to wavelength).

The diffraction grating formed on the exit surface of the fθ2 lens does not necessarily have to have power in the sub scanning direction and may have power in the main scanning direction alone. Thus, in the case where the diffraction grating formed on the fθ2 lens is a diffraction grating having power only in the main scanning direction, occurrence of "longitudinal chromatic aberration" can be restrained (that is, defocusing variation when the temperature has changed can be reduced). Further, it is possible to restrain fluctuation of f of the fθ characteristics due to the wavelength fluctuation.

Of course, in consideration of the manufacturing cost and the number of process steps, the diffraction grating formed on the fθ2 lens may have power both in the main scanning direction and in the sub scanning direction.

Also, as the optical element having the diffraction grating surface formed thereon is the fθ2 lens having a curved incident surface and exit surface, wavefront aberration on the image surface can be improved while the beam position and defocusing are corrected according to temperature change (temperature compensation).

Here, in this example, the diffraction grating surface is formed on the exit surface of each fθ2 lens provided for each photoconductor. However, the configuration is not limited to this. As a matter of course, a diffraction element surface can be similarly provided on an fθ2 lens shared by plural photoconductors (shared optical element). Also, in this example, the diffraction grating surface is formed on the fθ2 lenses. However, the configuration is not limited to this. For example, it is also possible to form a diffraction grating surface on an arbitrary surface of an arbitrary optical element which satisfies the above conditions, of the plural optical elements forming the light scanning device, such as the fθ1 lens.

Fourth Embodiment

Next, the fourth embodiment of the invention will be described. This embodiment is a modification of the above first embodiment. Hereinafter, in this embodiment, the units and elements having the similar functions as those described in the first embodiment are denoted by the same reference numerals and will not be described further in detail.

In the fourth embodiment, a diffraction element surface is appended to the exit side of the fθ1 lens in the light scanning device according to the first embodiment, thus optimizing optical characteristics.

Figure 30:
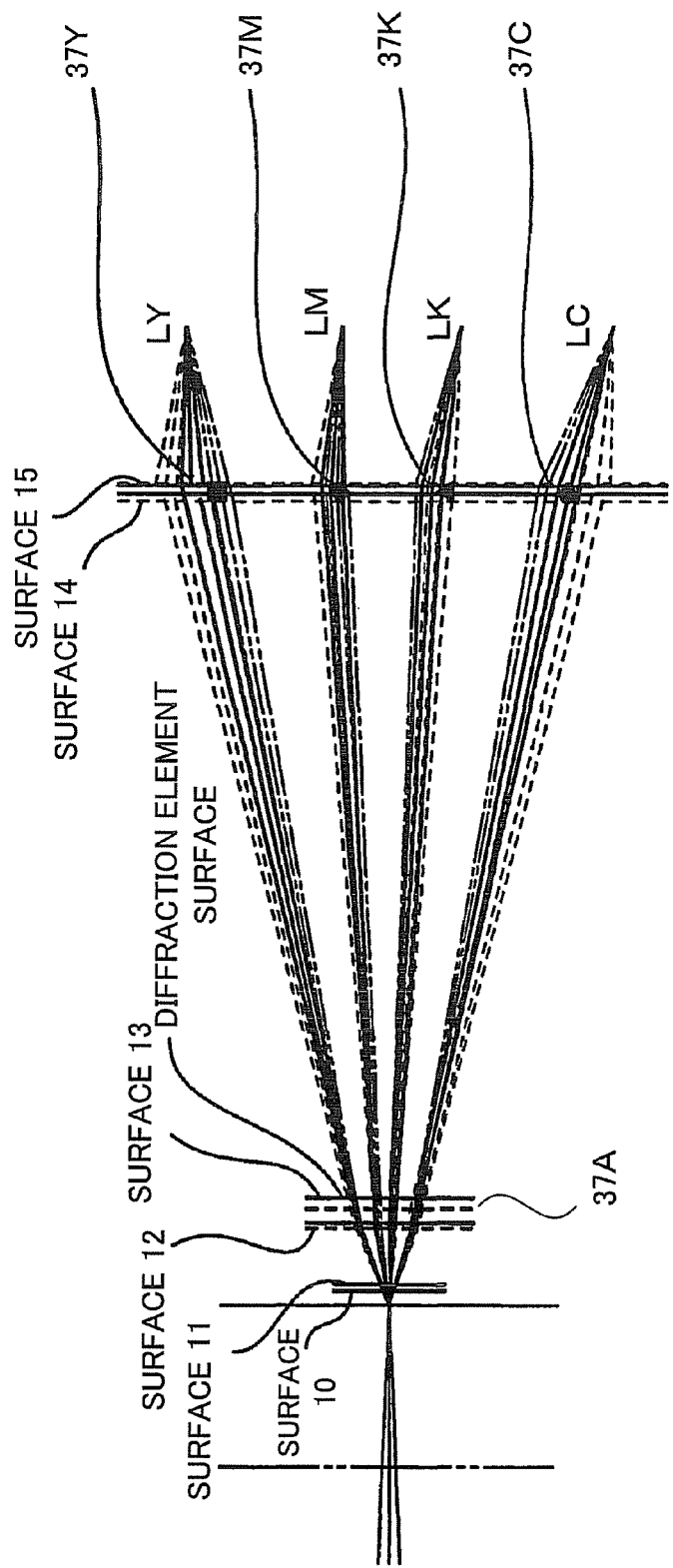
FIG. 30 is a longitudinal sectional view of the optical path in the light scanning device according to the fourth embodiment of the invention, as enlarged in the sub scanning direction.

FIG. 29 is a plan view showing an optical path in a light scanning device according to the fourth embodiment of the invention. FIG. 30 is a longitudinal sectional view showing the optical path in the light scanning device according to the fourth embodiment of the invention, as enlarged in the sub scanning direction. FIG. 31 is a table showing optical layout data in the light scanning device according to the fourth embodiment of the invention. FIG. 32 is a table showing paraxial characteristic data in the light scanning device according to the fourth embodiment of the invention. FIG. 33 is a table showing decentration and tilt data in the light scanning device according to the fourth embodiment of the invention. FIG. 34 is a table showing coefficient data representing the lens shape in the light scanning device according to the fourth embodiment of the invention.

Here, FIG. 31 corresponds to FIG. 9 in the first embodiment. FIG. 32 corresponds to FIG. 10 in the first embodiment. FIG. 33 corresponds to FIG. 11 in the first embodiment. FIG. 34 corresponds to FIG. 12 in the first embodiment. Moreover, FIG. 29 corresponds to FIG. 5 in the first embodiment. FIG. 30 corresponds to FIG. 6 in the first embodiment.

In FIG. 31, REFRACTIVE INDEX AFTER REFLECTION, DISTANCE BETWEEN SURFACES AND SHAPE DATA HAVE NEGATIVE SIGN (−) ADDED THERETO; LENS SURFACE SHAPE WITH CURVED SURFACE POLYNOMIAL COEFFICIENT DATA IS EXPRESSED BY THE FOLLOWING EQUATION: $X=(cuy*y^2+cuz*z^2)/(1+Sqrt(1-ay*cuy^2*y^2-az*cuz^2*z^2))=\Sigma a_{lm}*y^l*z^m$; IN THIS EXAMPLE, ay=1, az=1; y DIRECTION: MAIN SCANNING DIRECTION, z DIRECTION: SUB SCANNING DIRECTION, x DIRECTION: DIRECTION OF OPTICAL AXIS (+ SIDE IN EACH LOCAL COORDINATE SYSTEM OF PRE-DEFLECTION OPTICAL SYSTEM AND − SIDE IN EACH LOCAL COORDINATE SYSTEM OF POST-DEFLECTION OPTICAL SYSTEM.

The configuration shown in FIG. 29 is substantially the same as the configuration shown in FIG. 5 in the first embodiment. However, the fourth embodiment is different from the first embodiment in that a diffraction element surface is provided on the exit side of the fθ1 lens.

Since the diffraction element is provided as in this embodiment, the optical coefficients of the fθ2 lenses 37Y, 37M, 37C and 37K change. As a whole, various optical coefficients and characteristics in the light scanning device according to the fourth embodiment take values as shown in FIG. 31 to FIG. 34.

As can be seen from FIG. 30, the spacing between the rays situated at both ends in the sub scanning direction (vertical direction) (rays corresponding to $\theta_1$ and $\theta_3$, which have the maximum absolute value of tilt angle from the central axis of rotation of the polygon mirror) and the rays next to them is greater than the spacing between the rays corresponding to $\theta_2$ and $\theta_4$, which do not have the maximum absolute value of tilt angle from the central axis of rotation of the polygon mirror. This feature is similar to the first embodiment.

Also, since the distance between rays becomes greater toward the downstream in the traveling direction of the rays, the rays corresponding to $\theta_1$ and $\theta_3$, which have the maximum absolute value of tilt angle from the central axis of rotation of the polygon mirror, can be separated from the other rays on the upstream side of the rays.

Therefore, even in the case where the diffraction element surface is provided on the exit surface of the fθ1 lens 37A, the rays can be guided to the photoconductive drums through the optical path similar to the optical path shown in FIG. 2 and FIG. 3 of the first embodiment.

That is, the rays LC and LY are rays situated at both ends in the sub scanning direction. The ray LY is separated from the other rays at the most upstream position and the ray LC is separated from the other rays at the third most upstream position. In this way, the second folding mirror 34C for the ray LC, and the ray LK passing through the outermost side in the sub scanning direction can be prevented from interfering with each other, compared to the case where the ray LK is set as a ray at one end.

Thus, even in the case where the diffraction element surface is provided on the exit surface of the fθ1 lens 37A, as in this embodiment, as the configuration is employed in which the position where the rays situated at both ends in the sub scanning direction are separated in the post-deflection optical system is the most upstream part (polygon mirror side) of the optical path and the third most upstream part, the mounting space can be reduced. Moreover, it is not necessary to carry out chamfering processing to the folding mirror in order to avoid interference between the rays and the folding mirror.

In any of the above embodiments, as shown in FIG. 9 to FIG. 28, the post-deflection optical system has a shared optical element which passes plural rays to be guided to plural photoconductors and has positive power in the main scanning direction and the sub scanning direction, and in which the power in the sub scanning direction is greater, and a lens which has positive power in the sub scanning direction acting on luminous fluxes reflected and deflected by plural reflection surfaces of the polygon mirror. In such a post-deflection optical system, the curvature in the main scanning direction and the sub scanning direction of both lenses forming the post-deflection optical system is changed separately in accordance with the position in the main scanning direction and the position in the sub scanning direction. Thus, the fθ characteristic, face tangle error correction characteristic and image forming characteristic that are necessary for the scanning optical system are realized.

In the above embodiments, a single optical element is used as the optical element that passes all the rays in the post-deflection optical system. However, the configuration is not limited to this. For example, in the case where this optical element may include plural lenses and the plural lenses are provided with power, it suffices that the combined power in the entire optical system holds the above-described relation. In this case, it is possible to employ a configuration in which the curvature is not changed according to the position in the main scanning and sub scanning directions.

Also, in the case where light reflected and deflected by the individual reflection surfaces of the polygon mirror is made incident on a lens which has positive power in the sub scanning direction acting on the rays corresponding to the reflection surfaces, if the lens is provided with negative power in the main scanning direction at the central part of the lens, the thickness at the central part of the lens can be prevented from increasing. Also, the power is increased toward the edge of the lens, thereby realizing performance of the fθ characteristic and image forming characteristic.

The lens which has positive power in the sub scanning direction acting on the rays reflected and deflected by the reflection surfaces having different tilt angles from each other with respect to the rotation axis of the polygon mirror has negative power in the main scanning direction at the central part of the lens. Thus, the thickness at the central part of the lens can be prevented from increasing.

In the configuration described in the above embodiments, at least a part of the first thrust-direction force generated by air resistance received by at least one surface of the reflection surfaces tilted with respect to the rotation axis of the polygon mirror is canceled by the second thrust-direction force generated by air resistance received by a surface tilted in the opposite direction to the surface that generates the first thrust-direction force with respect to the rotation axis (it may also be the reduction of the second thrust-direction force by the first thrust-direction force). However, the configuration is not limited to this. For example, a propeller which generates the second thrust-direction force as the polygon mirror rotates may be provided at an end part of the rotation axis of the polygon mirror.

Also, according to one embodiment of the invention, a light scanning device can be provided which includes: a rotary deflector configured to reflect and deflect an incident luminous flux by plural reflection surfaces arrayed in a rotating direction and thus cause the incident luminous flux to scan a predetermined direction, in which at least one of the plural reflection surfaces is tilted with respect to the rotation axis of the rotary deflector; and thrust-direction force canceling means supported in a rotatable manner integrally with the plural reflection surfaces of the rotary deflector, and for generating, by air resistance, a force in a direction opposite to a thrust-direction force generated by air resistance received by at least one surface of the reflection surfaces tilted with respect to the rotation axis.

In the light scanning device having the configuration as described above, it is desirable that the thrust-direction force canceling means generates a thrust-direction force by air resistance at the time of rotation of the rotary deflector, on at least one surface of the reflection surfaces tilted with respect to the rotation axis of the rotary deflector.

In the light scanning device having the configuration as described above, the rotary deflector has plural reflection surfaces with different tilt angles from each other with respect to the rotation axis, and the thrust-direction force canceling means can be configured to generate a thrust-direction force by air resistance at the time of rotation of the rotary deflector, on a surface having the largest tilt angle with respect to the rotation axis, of the plural reflection surfaces.

In the light scanning device having the configuration as described above, it is preferable that the thrust-direction force canceling means is configured to generate a thrust-direction force by air resistance at the time of rotation of the rotary deflector, on a surface tilted with respect to the rotation axis at the same angle as and in the opposite direction to a reflection surface having the largest tilt angle with respect to the rotation axis, of the plural reflection surfaces.

In the light scanning device having the configuration as described above, the plural reflection surfaces can be configured to be arrayed in such a combination that the difference in tilt angle with respect to the rotation axis between neighboring reflection surfaces is smaller than the maximum difference in angle that can be generated by a combination of the plural reflection surfaces.

In the light scanning device having the configuration as described above, it is desirable that the light scanning device causes a luminous flux from a light source to scan a photoconductive surface of each of plural photoconductors in a main scanning direction, and that the light scanning device has a pre-deflection optical system which shapes the light from the light source into a luminous flux having a predetermined sectional shape, guides the luminous flux toward the rotary deflector and condenses the luminous flux in a sub scanning direction in the vicinity of the reflection surfaces of the rotary deflector, and a post-deflection optical system which includes plural optical elements and guides the luminous flux reflected and deflected by each of the plural reflection surfaces of the rotary deflector to the photoconductive surface of the photoconductor corresponding to each reflection surface, wherein the post-deflection optical system include a shared optical element which provides, to the luminous flux which is reflected and deflected by the rotary deflector and should be guided to each of the plural photoconductors, such power that the luminous flux guided to the photoconductor surface by the post-deflection optical system has a predetermined optical characteristic on the photoconductor surface in accordance with the incident position of the luminous flux.

In the light scanning device having the configuration as described above, it is preferable that the predetermined optical characteristic is at least one of the beam diameter of the luminous flux, the degree of curving of a scanning line, and the position of the luminous flux with respect to a scanning area.

In the light scanning device having the configuration as described above, of the plural optical elements forming the post-deflection optical system, in at least one optical element on which the luminous flux to be guided to each of the plural photoconductors becomes incident at different incident positions from each other in a sub scanning direction orthogonal to the main scanning direction, a diffraction grating can be formed on at least one of an incident surface and an exit surface for the luminous flux in the optical element.

In the light scanning device having the configuration as described above, it is desirable that, of the plural optical elements forming the post-deflection optical system, in at least one optical element on which the luminous flux from the light source becomes incident at a different incident position from the optical path of the optical axis of the post-deflection optical system in a sub scanning direction orthogonal to the main scanning direction, a diffraction grating is formed on at least one of an incident surface and an exit surface for the luminous flux in the optical element.

Also, according to still another embodiment, an image forming apparatus can be provided which includes: a light scanning device having the configuration as described above;

a photoconductor on which an electrostatic latent image is formed by a luminous flux cast for scanning by the light scanning device; and a developing unit configured to develop the electrostatic latent image formed on the photoconductor.

Moreover, according to still another embodiment, a rotary deflector can be provided which reflects and deflects an incident luminous flux by plural reflection surfaces arrayed in a rotating direction and thus causes the incident luminous flux to scan a predetermined direction, and which includes: plural reflection surfaces arrayed in a rotating direction, with one surface of the plural reflection surfaces being tilted with respect to a rotation axis; and a thrust-direction force canceling unit supported in a rotatable manner integrally with the plural reflection surfaces and having a wind receiving surface tilted with respect to the rotation axis of the rotary deflector in a direction opposite to at least one surface of the reflection surfaces tilted with respect to the rotation axis.

The specific embodiments of the present invention have been described in detail. However, it is obvious to those skilled in the art that various changes and modifications can be made without departing from the spirit and scope of the invention.

As described above in detail, according to the present invention, in a light scanning technique of reflecting and deflecting incident light by a rotary deflector, a technique to reduce adverse effects of a thrust-direction force generated by air resistance received by a reflection surface of the rotary deflector can be provided.

What is claimed is:

1. A light scanning device comprising:
   a rotary deflector configured to reflect and deflect an incident luminous flux by plural reflection surfaces arrayed in a rotating direction and thus cause the incident luminous flux to scan a predetermined direction, in which at least one of the plural reflection surfaces is tilted with respect to the rotation axis of the rotary deflector; and
   thrust-direction force canceling member supported in a rotatable manner integrally with the plural reflection surfaces of the rotary deflector, and for generating, by air resistance, a force in a direction opposite to a thrust-direction force generated by air resistance received by at least one surface of the reflection surfaces tilted with respect to the rotation axis.

2. The light scanning device according to claim 1, wherein the thrust-direction force canceling member generates a thrust-direction force by air resistance at the time of rotation of the rotary deflector, on at least one surface of the reflection surfaces tilted with respect to the rotation axis of the rotary deflector.

3. The light scanning device according to claim 2, wherein the rotary deflector has plural reflection surfaces with different tilt angles from each other with respect to the rotation axis, and
   the thrust-direction force canceling member generates a thrust-direction force by air resistance at the time of rotation of the rotary deflector, on a surface having the largest tilt angle with respect to the rotation axis, of the plural reflection surfaces.

4. The light scanning device according to claim 3, wherein the thrust-direction force canceling member generates a thrust-direction force by air resistance at the time of rotation of the rotary deflector, on a surface tilted with respect to the rotation axis at the same angle as and in a direction opposite to a reflection surface having the largest tilt angle with respect to the rotation axis, of the plural reflection surfaces.

5. The light scanning device according to claim 3, wherein the plural reflection surfaces are arrayed in such a combination that the difference in tilt angle with respect to the rotation axis between neighboring reflection surfaces is smaller than the maximum difference in angle that can be generated by a combination of the plural reflection surfaces.

6. The light scanning device according to claim 1, wherein the light scanning device causes a luminous flux from a light source to scan a photoconductive surface of each of plural photoconductors in a main scanning direction,
   the light scanning device has
   a pre-deflection optical system which shapes the light from the light source into a luminous flux having a predetermined sectional shape, guides the luminous flux toward the rotary deflector and condenses the luminous flux in a sub scanning direction in the vicinity of the reflection surfaces of the rotary deflector, and
   a post-deflection optical system which includes plural optical elements and guides the luminous flux reflected and deflected by each of the plural reflection surfaces of the rotary deflector to the photoconductive surface of the photoconductor corresponding to each reflection surface,
   wherein the post-deflection optical system includes a shared optical element which provides, to the luminous flux which is reflected and deflected by the rotary deflector and should be guided to each of the plural photoconductors, such power that the luminous flux guided to the photoconductor surface by the post-deflection optical system has a predetermined optical characteristic on the photoconductor surface in accordance with the incident position of the luminous flux.

7. A thrust-direction force canceling method comprising canceling at least a part of a first thrust-direction force generated by air resistance received by at least one surface of reflection surfaces arrayed in a rotating direction of a rotary deflector and tilted with respect to the rotation axis of the rotary deflector, by a second thrust-direction force generated by air resistance received by a surface tilted with respect to the rotation axis in a direction opposite to the surface where the first thrust-direction force is generated.

8. The thrust-direction force canceling method according to claim 7, wherein the second thrust-direction force by air resistance at the time of rotation of the rotary deflector is generated on at least one surface of the reflection surfaces tilted with respect to the rotation axis of the rotary deflector.

9. The thrust-direction force canceling method according to claim 8, wherein the rotary deflector has plural reflection surfaces having different tilt angles from each other with respect to the rotation axis, and
   the second thrust-direction force by air resistance at the time of rotation of the rotary deflector is generated on a surface having the largest tilt angle with respect to the rotation axis, of the plural reflection surfaces.

10. The thrust-direction force canceling method according to claim 9, wherein the second thrust-direction force is generated by air resistance at the time of rotation of the rotary deflector, on a surface tilted in a direction opposite to the surface having the largest title angle with respect to the rotation axis, of the plural reflection surfaces, and at the same angle as the reflection surface.

11. The thrust-direction force canceling method according to claim 9, wherein the plural reflection surfaces are arrayed in such a combination that difference in tilt angle with respect to the rotation axis between neighboring reflection surfaces is smaller than maximum difference in angle that can be generated by a combination of the plural reflection surfaces.

* * * * *